(12) United States Patent
Wu et al.

(10) Patent No.: US 10,587,208 B2
(45) Date of Patent: Mar. 10, 2020

(54) TRIBOELECTRIC GENERATOR HOUSING AND SYSTEM FOR VEHICLE WHEEL

(71) Applicant: Toyota Motor Engineering & Manufacturing North America, Inc., Erlanger, KY (US)

(72) Inventors: Songtao Wu, Ann Arbor, MI (US); Chi-Ming Wang, Ann Arbor, MI (US); Khoa Vo, Ypsilanti, MI (US); Debasish Banerjee, Ann Arbor, MI (US); Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 418 days.

(21) Appl. No.: 15/433,598

(22) Filed: Feb. 15, 2017

(65) Prior Publication Data

US 2018/0205327 A1    Jul. 19, 2018

Related U.S. Application Data

(60) Provisional application No. 62/448,069, filed on Jan. 19, 2017.

(51) Int. Cl.
*H02N 1/04* (2006.01)
*B60C 23/04* (2006.01)
*B60C 19/00* (2006.01)
*B60C 1/00* (2006.01)

(52) U.S. Cl.
CPC .............. *H02N 1/04* (2013.01); *B60C 1/00* (2013.01); *B60C 19/00* (2013.01); *B60C 23/0411* (2013.01)

(58) Field of Classification Search
CPC ........ H02N 1/04; B29C 33/424; B29C 41/12; B60K 25/10
USPC .......................................................... 310/310
See application file for complete search history.

(56) References Cited

U.S. PATENT DOCUMENTS

2014/0338458 A1    11/2014  Wang et al.
2015/0061464 A1*   3/2015   Park ...................... H01L 41/113
                                                 310/329

FOREIGN PATENT DOCUMENTS

CN     204258659 U    4/2015
JP     2015077958 A   4/2015

OTHER PUBLICATIONS

Zhang et al., "Single-Electrode-Based Rotating Triboelectric Nanogenerator for Harvesting Energy from Tires", 2013 American Chemical Society, vol. 7, No. 1, 2014, 10 pages.

(Continued)

*Primary Examiner* — Terrance L Kenerly
(74) *Attorney, Agent, or Firm* — Christopher G. Darrow; Darrow Mustafa PC

(57) ABSTRACT

An elastomeric triboelectric generator housing structured for incorporation into a wheel for a vehicle is provided. The housing includes a least one cavity having a pair of opposed walls, and a triboelectric generator incorporated into the at least one cavity. The at least one cavity is structured to actuate responsive to application of at least one force to the housing along an axis extending through the at least one cavity and between a central axis of the housing and a circumference of the housing.

20 Claims, 23 Drawing Sheets

(56) References Cited

OTHER PUBLICATIONS

Mao et al., "Single-electrode triboelectric nanogenerator for scavenging friction energy from rolling tires", Elsevier, Nano Energy (2015), pp. 227-234, 8 pages.

AENews, "Goodyear releases electricity-generating tire concept" Mar. 9, printed on Feb. 15, 2017 from http://www.alternative-energy-news.info/goodyear-electric-tire-concept/ in 5 pages.

* cited by examiner

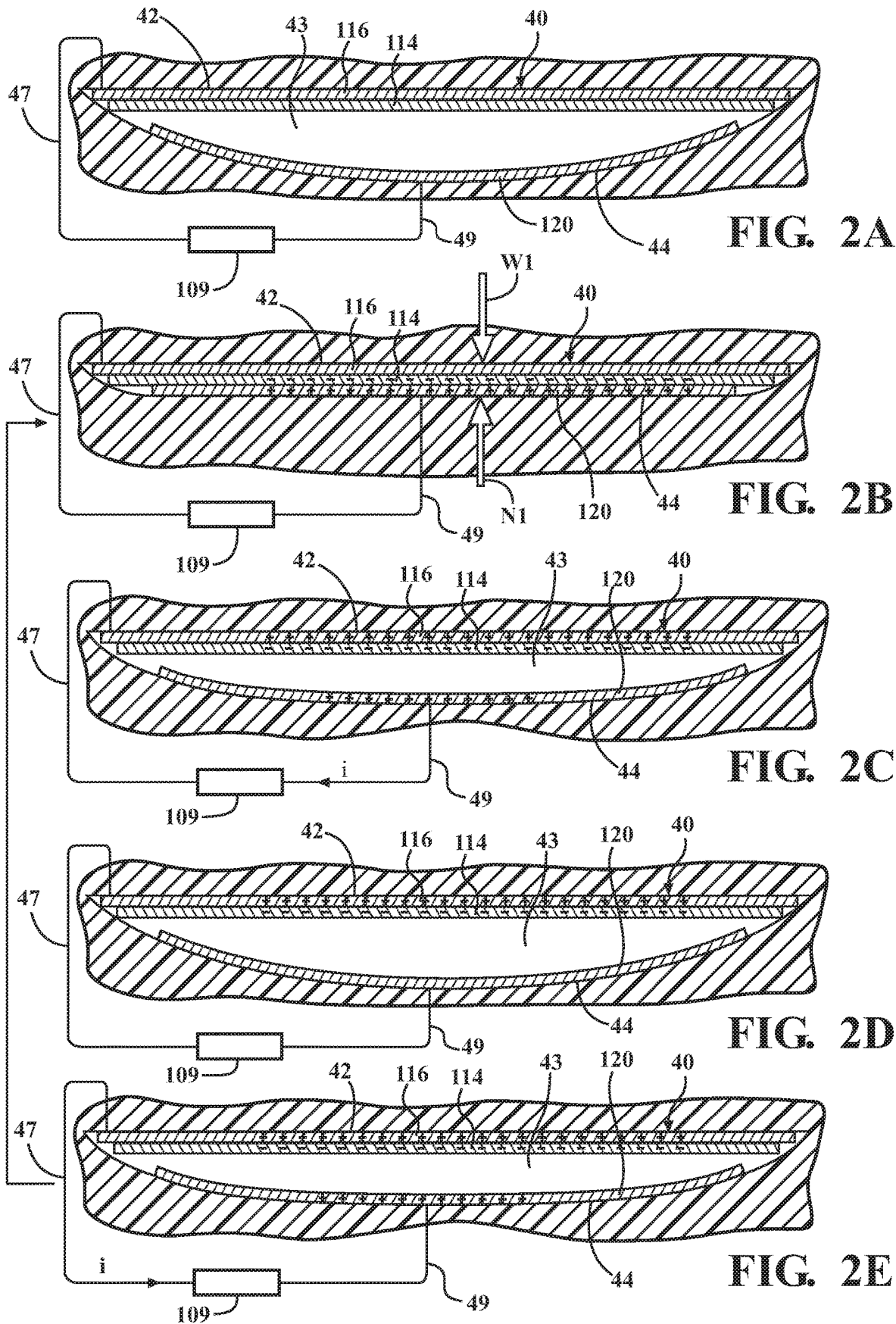

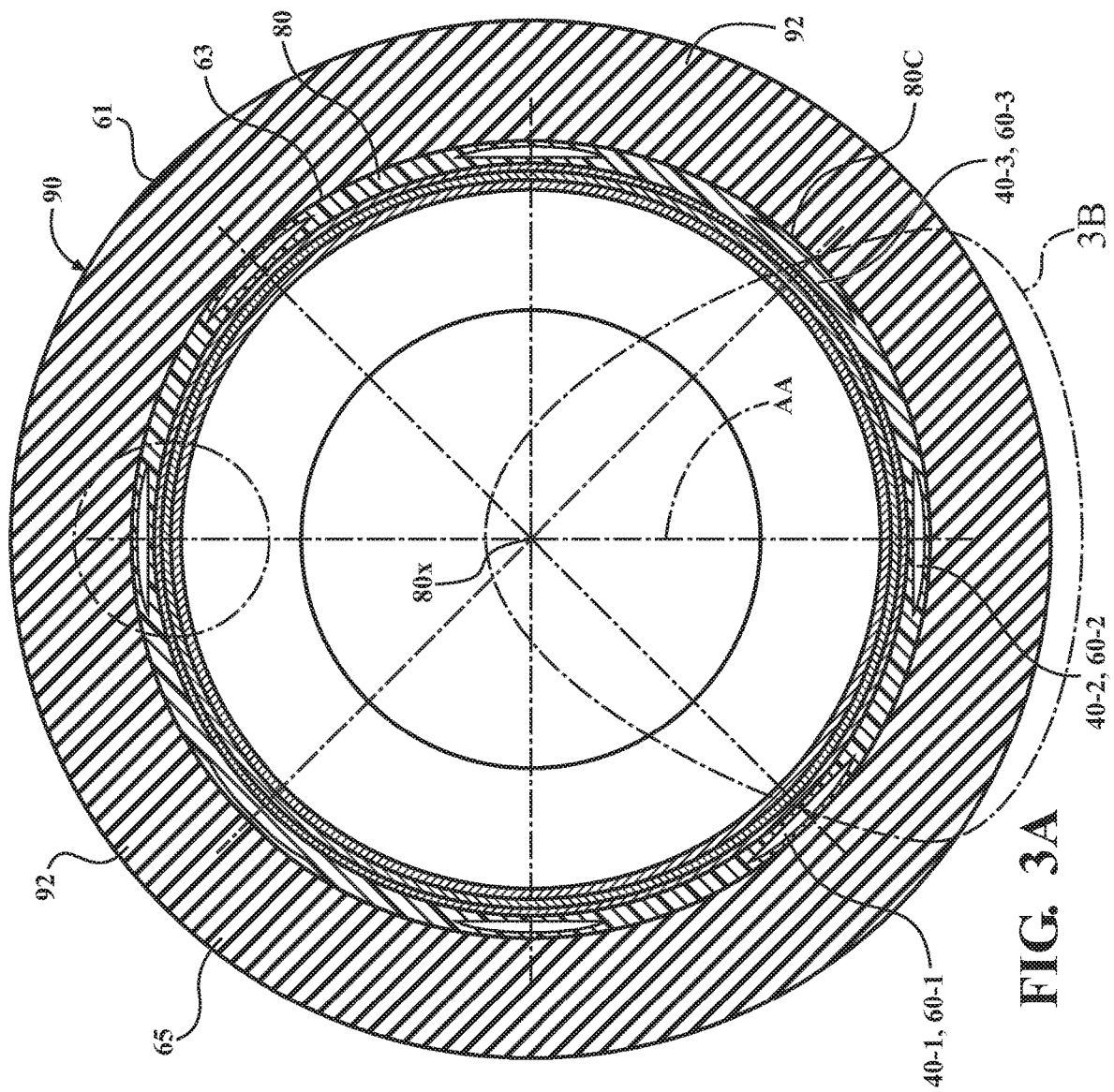
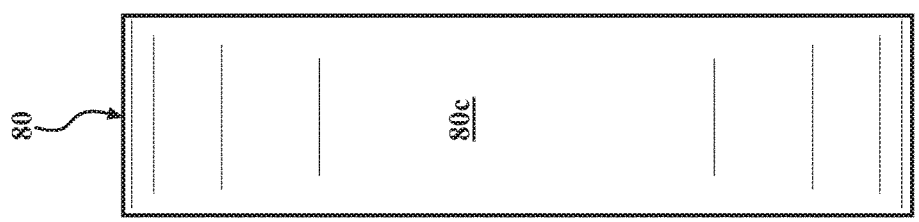
FIG. 3A
FIG. 3C

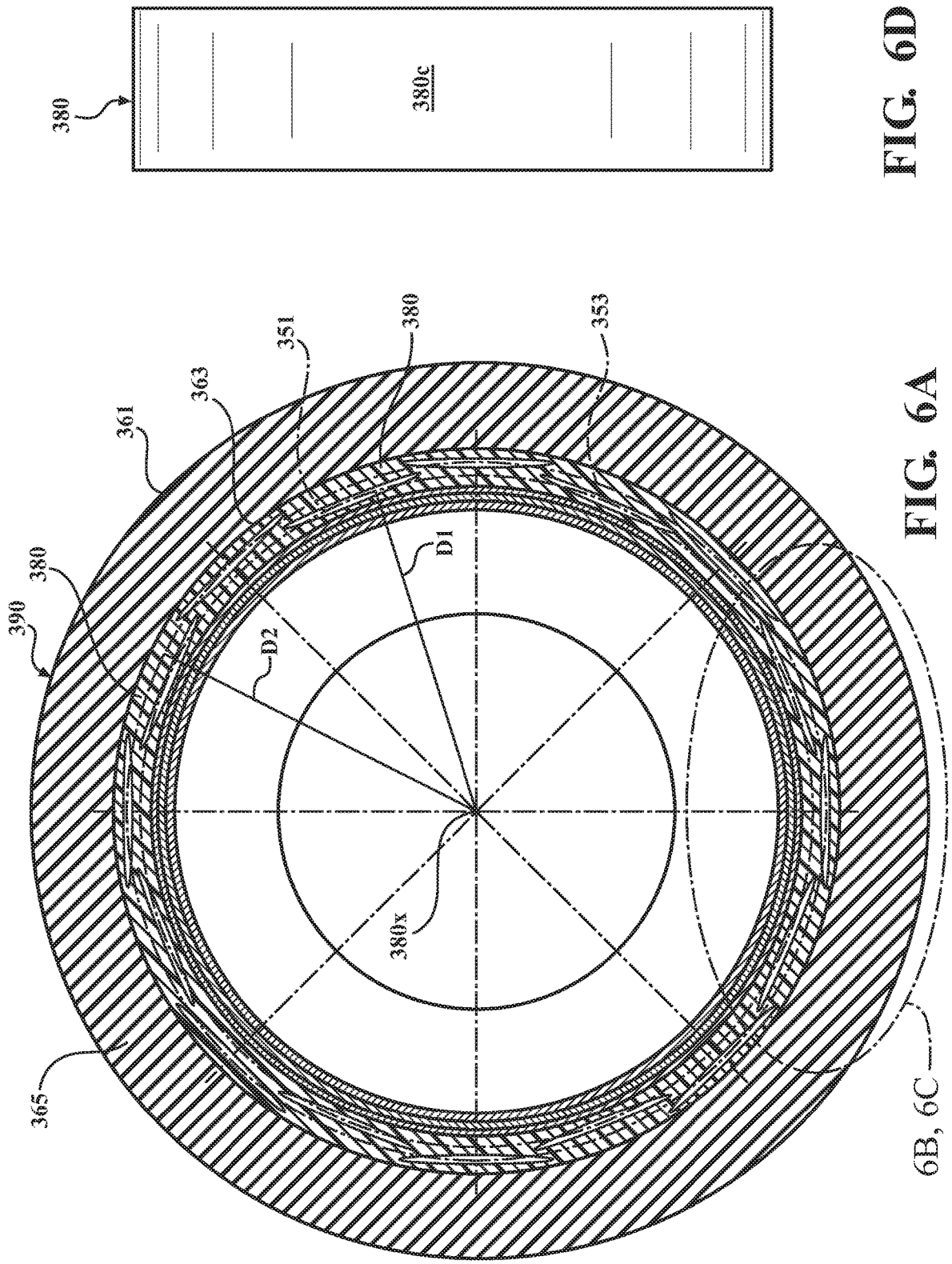

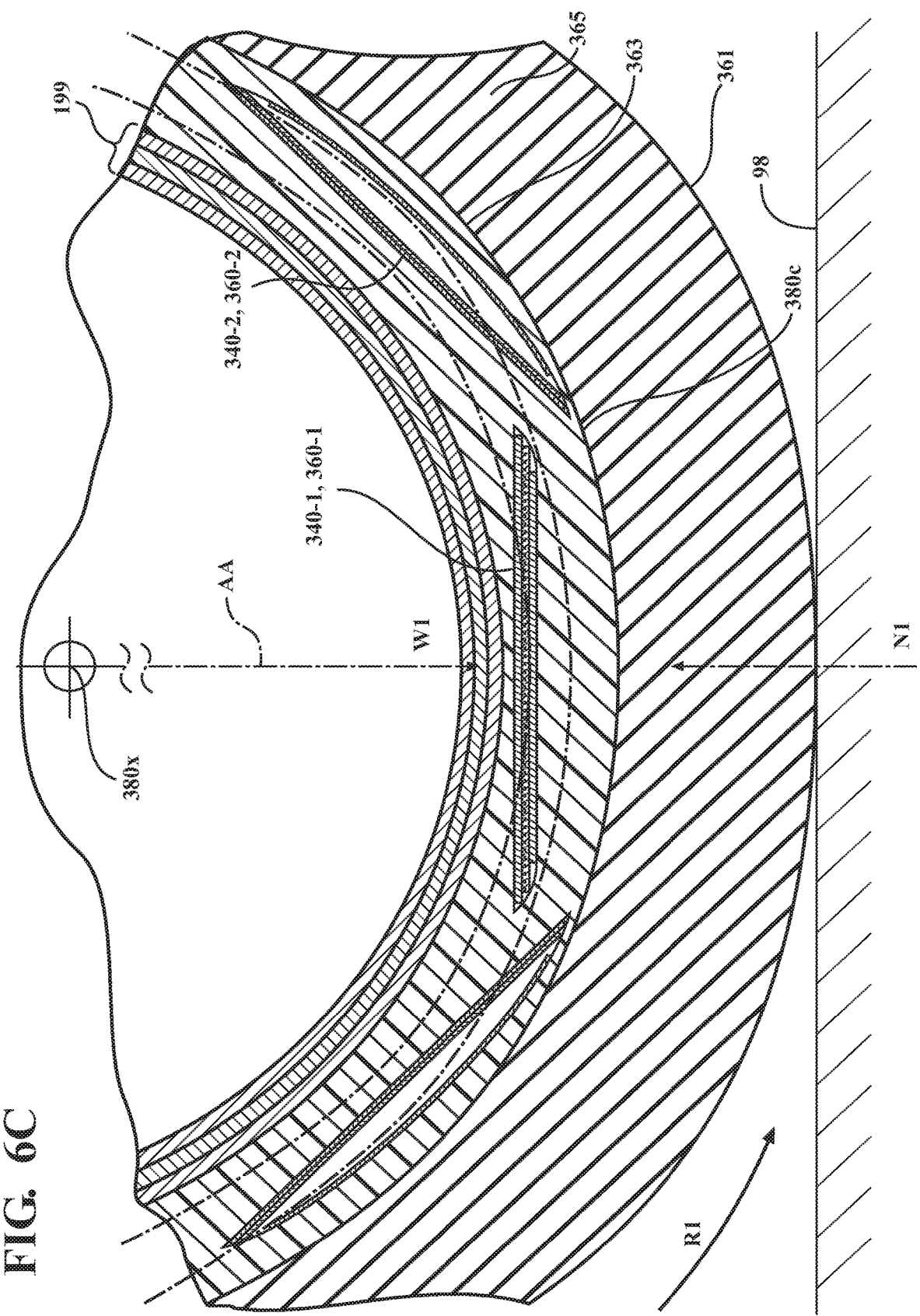

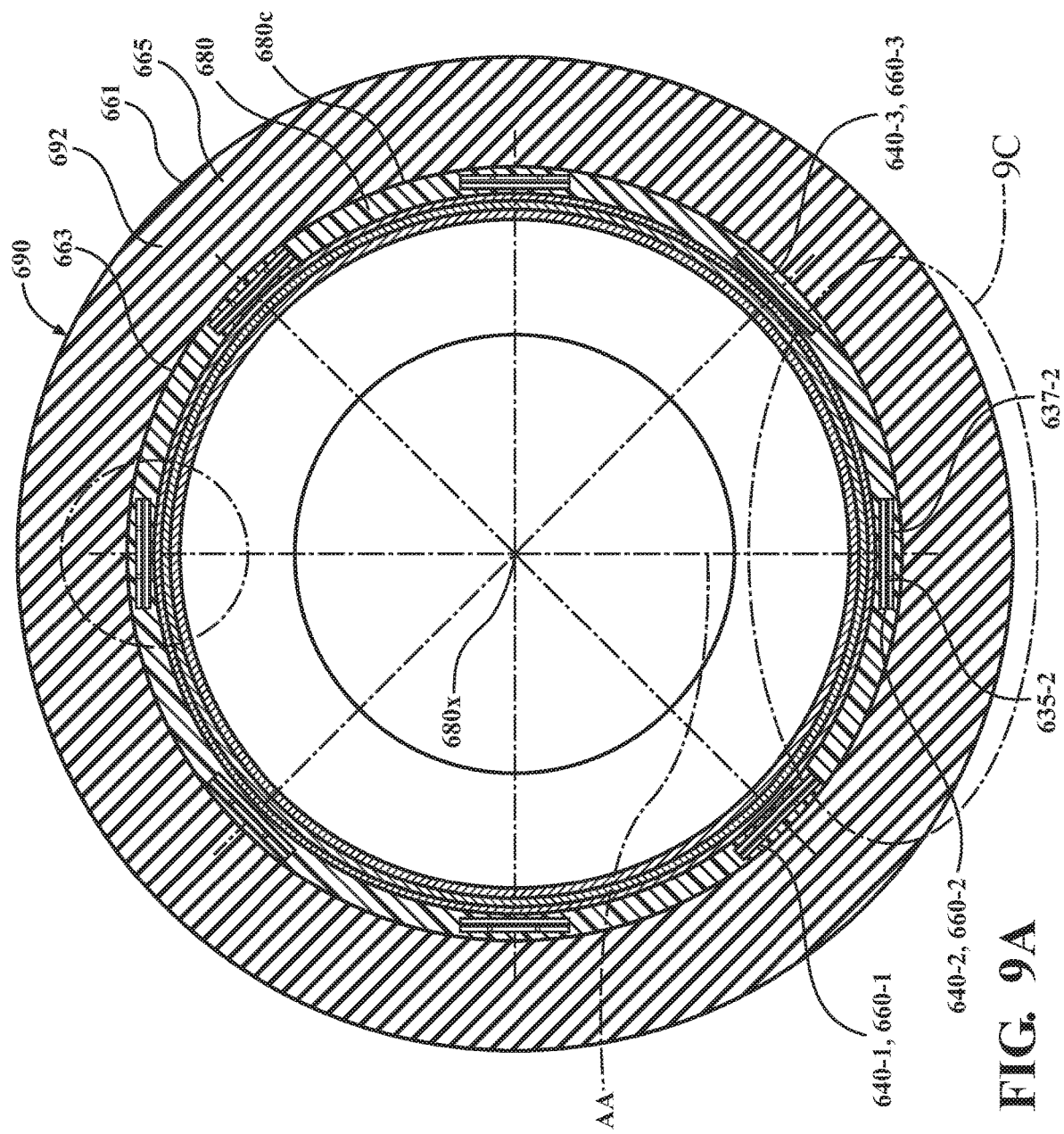
FIG. 9A
FIG. 9D

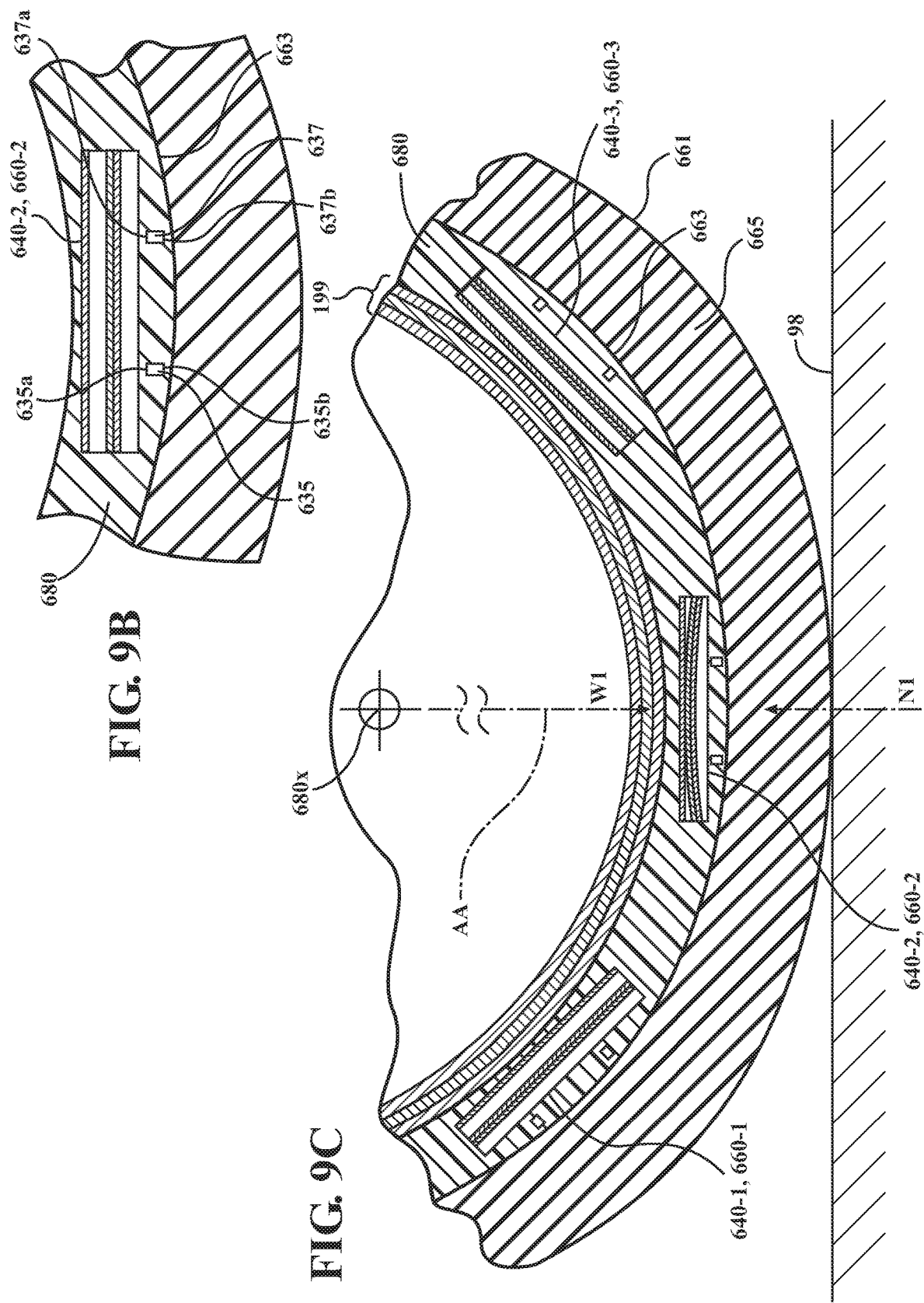

TRIBOELECTRIC GENERATOR HOUSING AND SYSTEM FOR VEHICLE WHEEL

CROSS REFERENCE TO RELATED APPLICATIONS

This application claims benefit of U.S. Provisional Application No. 62/448,069, filed on Jan. 19, 2017, which is herein incorporated by reference in its entirety.

TECHNICAL FIELD

The present invention relates to generators and, more specifically, to a system for generating voltage and current using the triboelectric effect.

BACKGROUND

A generator using the triboelectric principle converts external mechanical energy into electricity by a combination of contact-electrification and electrostatic induction. Contact electrification takes place when certain materials with opposite triboelectric polarities become electrically charged after they come into contact with each other. The separation of these materials with opposite triboelectric polarities may drive separated electrons between electrodes of the triboelectric generator. However, due to such factors as contaminants and wear during use, it may be difficult to derive power from a generator using the triboelectric principle.

SUMMARY

In one aspect of the embodiments described herein, an elastomeric triboelectric generator housing structured for incorporation into a wheel for a vehicle is provided. The housing includes at least one cavity having a pair of opposed walls, and a triboelectric generator incorporated into the at least one cavity. The at least one cavity is structured to actuate responsive to application of at least one force to the housing along an axis extending through the at least one cavity and between a central axis of the housing and a circumference of the housing.

In another aspect of the embodiments described herein, a wheel for a vehicle is provided. The wheel includes a tire having an elastomeric triboelectric generator housing positioned within an interior of the tire. The housing has at least one cavity including a pair of opposed walls. The at least one cavity is structured to actuate responsive to application of at least one force to the housing along a line extending through the at least one cavity and between a central axis of the housing and a circumference of the housing. The circumference of the housing is in intimate contact with an interior surface of an outer wall of the tire structured to contact a road surface.

In another aspect of the embodiments described herein, a triboelectric power generating system is provided. The generating system includes an elastomeric triboelectric generator housing, at least one triboelectric generator incorporated into the housing, and a power management circuit electrically coupled to the at least one triboelectric generator. The power management circuit is configured to receive an input current from the at least one triboelectric generator and to deliver an output current to a load.

BRIEF DESCRIPTION THE DRAWINGS

FIGS. 2A-2E are a series of schematic views showing operation of a first embodiment of a triboelectric generator as described herein.

FIGS. 3A-3C are schematic views of a vehicle wheel including a housing having multiple angularly spaced-apart triboelectric generator cavities structured as shown in FIG. 1.

FIGS. 6A-6D are schematic views of a vehicle wheel including a housing having multiple angularly spaced-apart triboelectric generator cavities structured in accordance with another embodiment described herein.

FIGS. 9A-9D are schematic views of a vehicle wheel including a housing having multiple angularly spaced-apart triboelectric generator cavities structured in accordance with another embodiment described herein.

DETAILED DESCRIPTION

The present invention relates to various embodiments of an elastomeric triboelectric generator housing having cavities formed therein. Elements from a triboelectric series may be deposited on inside walls of each cavity to form a triboelectric generator in the cavity. The housing may be incorporated into a vehicle wheel such that rotation of the wheel opens and closes the cavities, thereby actuating the triboelectric generators in the cavities and generating associated current flows. In one or more arrangements, the housing may be incorporated into the structure of a vehicle tire, in the interior of the tire. This may protect the elastomeric triboelectric generator housing and the generators from exposure to the elements.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
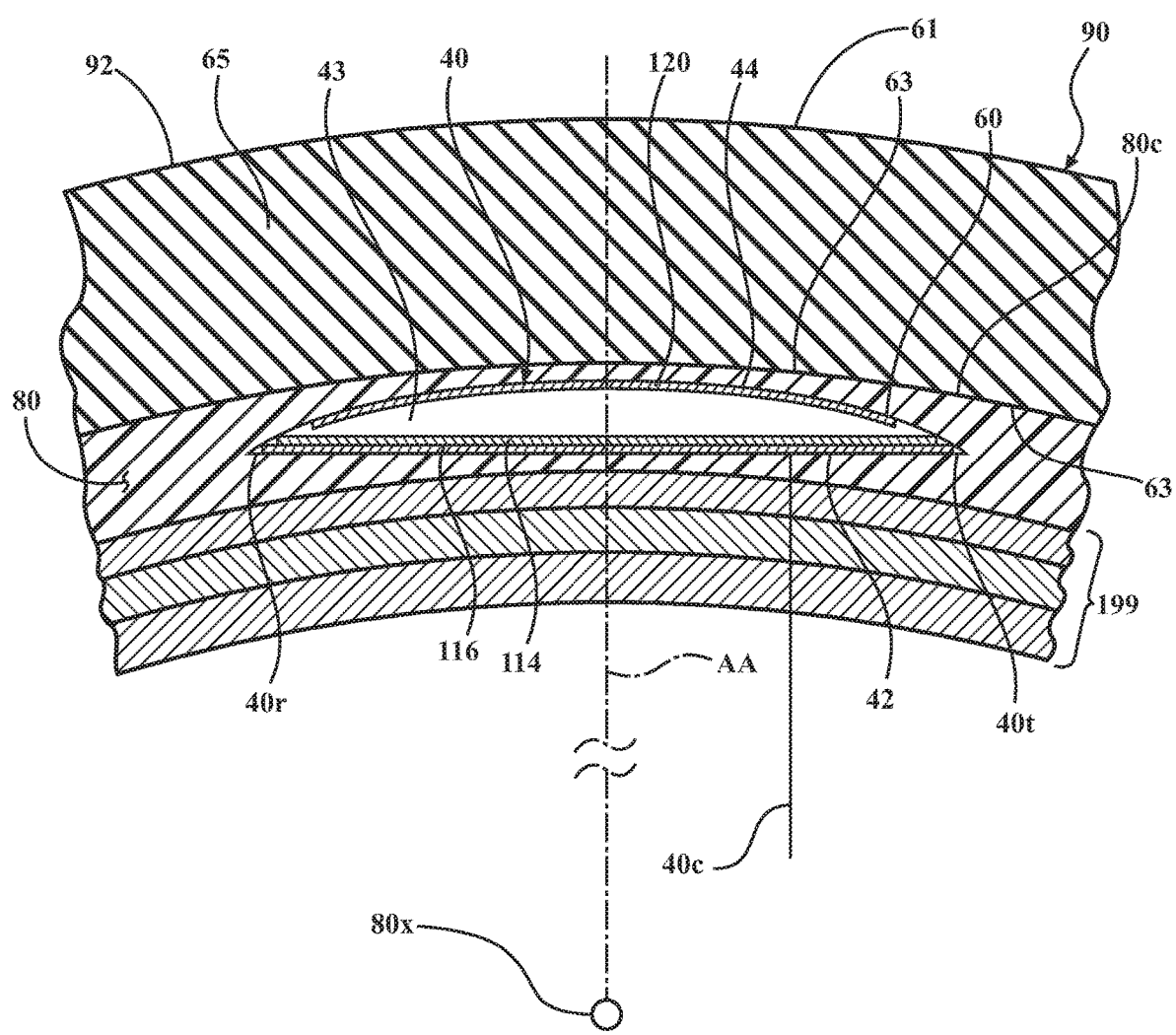
FIG. 1 is a schematic view of a first embodiment of a cavity and associated triboelectric generator which may be provided in an elastomeric triboelectric generator housing as described herein.

FIG. 1 is a schematic view of a first embodiment of a cavity 40 which may be formed in an elastomeric triboelectric generator housing 80 as described herein. The cavity 40 may house an embodiment of a triboelectric generator, generally designated 60. In the embodiment shown in FIG. 1, cavity 40 has a pair of opposed walls including a first wall 42 and a second wall 44. At least one wall of the pair of opposed walls 42 and 44 may have an arcuate or concave shape. In the embodiment shown in FIG. 1, second wall 44 has an arcuate or concave shape, while first wall 42 is straight or flat. In another embodiment (shown in FIGS. 4A-4D), each of the opposed walls forming the cavity has an arcuate or concave shape. Alternatively, the cavity may have any of a variety of additional shapes, several of which are illustrated in the accompanying drawings. Also, in the embodiment shown in FIG. 1, the cavity 40 may be formed in housing 80 so that the arcuate wall 44 resides closest to an outer wall 65 of a tire 92, when the housing 80 containing the cavity 40 is positioned within and secured to an interior surface 63 of the outer wall as described herein. As is known, the outer wall 65 may include an interior surface 63 (to which the housing 80 may be secured) and an exterior or tread surface 61 extending along an exterior of the tire 92, which may be structured for contacting a road surface as the vehicle moves.

As seen in the drawings, the embodiments of the housing may be positioned and secured in intimate contact with an interior surface of the tire outer wall incorporating the tire tread. This helps ensure that road contact forces are transmitted through the tread to the housing as rapidly and efficiently as possible, to ensure actuation of the housing cavities and their associated triboelectric generators as described herein. The elastomeric triboelectric generator housing may be secured to the inner surface of the outer wall using any suitable method, for example, adhesive attachment. In one or more arrangements, the elastomeric triboelectric generator housing may be sandwiched between the inner surface of the outer wall and the belt/carcass/inner liner layers (collectively designated 199 in the drawings) that would otherwise be in intimate contact with the tire outer wall.

Housing embodiments described herein may have any shape suitable for a particular application. In one or more arrangements, the housing may have a cylindrical overall shape as shown in the drawings. In particular embodiments, the housing may have an annular shape as shown in the drawings. The housing embodiments may be formed using any suitable process or processes, for example, molding. The fabrication details of an embodiment of the elastomeric triboelectric generator housing described herein may depend on the processing requirements of the particular elastomeric material from which the housing is formed.

In the embodiment shown in FIG. 1, the housing 80 in which the cavity 40 is formed may be fabricated such that the opposed walls 42 and 44 define a space 43 therebetween when the cavity 40 is in an open condition. The cavity 40 may normally be in the open condition shown in FIG. 1. The cavity 40 and housing 80 may be structured so that the space 43 is closed when one or more forces are applied to bring the walls 42 and 44 into contact with each other. The cavity 40 may be formed in the housing 80 using any of a variety of methods, depending on the desired open shape of the cavity, the orientation of the cavity in the housing, and other pertinent factors. For example, the cavity 40 may be molded into the housing 80 or cut into the housing after the housing is molded.

In the triboelectric generator embodiment 60 shown in FIG. 1, the generator may include a first conductive electrode layer (or first electrode) 116 which may be affixed or attached to cavity first wall 42. First electrode 116 may be formed from any suitable conductive material, for example, a metallic material such as gold, copper, or aluminum, or from a material such as a conductive polymer. In particular embodiments, first electrode 116 is formed from gold.

First electrode 116 is in intimate contact with a first dielectric contact layer 114 facing the interior of cavity 40. First dielectric contact layer 114 may be formed from, for example, PDMS, PTFE, FEP, PVC, a Polyimide, or any material that has a triboelectric series rating indicating a propensity to gain electrons due to a contacting event. In particular embodiments, first dielectric contact layer 114 is formed from FEP. The first dielectric contact layer 114 may be positioned opposite a conductive second electrode 120 (described below) so as to enable contact with the second conductive electrode 120 during actuation of the cavity as described herein.

Second conductive electrode (or second electrode) 120 may be affixed or attached to cavity second wall 44. Second electrode 120 may include an electrically conductive metal layer (which could include a material such as aluminum, a metal or a conductive polymer) that has a triboelectric series rating indicating a propensity to lose electrons when contacted by the first dielectric contact layer 114. In particular embodiments, second electrode 120 is formed from aluminum.

A housing (such as housing 80) in which the cavity 40 is formed may be structured such that the first dielectric contact layer 114 and the second electrode 120 are spaced apart from each other when the cavity is open, and such that the first dielectric contact layer 114 and the second electrode 120 come into contact with each other when the cavity is closed, thereby causing a charge imbalance when the cavity opens after being closed.

In alternative embodiments of the triboelectric generator, a conductive elastomer material may be used in place of one or more of the triboelectric materials (such as aluminum and FEP) affixed to the cavity walls to form the generator. This structure may form an all-elastomeric triboelectric generator.

For purposes described herein, a cavity is considered to open or to be in an "open" condition when the triboelectric materials on opposed walls of the cavity are not in contact with each other, such as when no forces are applied to the housing to force the walls 42 and 44 into contact with each other. FIGS. 1 and 2A show examples of cavities in an open condition. A cavity is considered to "close" or to be in a "closed" condition and the opposed walls of the cavity in contact with each other when the triboelectric materials facing each other on the opposed walls of the cavity are in contact with each other. FIG. 2B shows an example of a cavity 40 as shown in FIG. 1 in a closed condition. The opposed walls and the triboelectric materials applied to the walls may be brought into intimate contact with each other by application of forces to one or more of the walls, in a manner described herein.

For purposes described herein, a cavity such as cavity 40 or a triboelectric generator incorporated into a cavity is considered to "actuate" when the cavity transitions from an open condition to a closed condition, or from a closed condition to an open condition. Actuation of a cavity incorporating a triboelectric generator will also actuate or operate the generator to generate a flow of current as described herein.

FIGS. 2A-2E are a series of schematic views showing operation of the previously-described embodiment of the triboelectric generator 60 provided in cavity 40 of FIG. 1. For purposes of illustration, in the exemplary embodiment shown in FIGS. 2A-2E, first electrode 116 may be formed from gold, first dielectric contact layer 114 may be formed from FEP, and second electrode 120 may be formed from aluminum. However, in other triboelectric generator embodiments, other triboelectric materials may be used for the first electrode, first dielectric contact layer, and second electrode.

First electrode 116 may be electrically coupled to a load 109 (such as an LED, a battery, or other load) as shown in FIGS. 2A-2E) by a first conductive element 47 (such as a wire). Similarly, second electrode 120 may be electrically coupled to the load 109 by a second conductive element 49. This enables a flow of generated current between the electrodes during operation of the triboelectric cycle. During operation of the triboelectric generator 60, a cycled generation of potential difference between the first and second electrodes 116 and 120 may drive a flow of electrons through the load 109.

FIG. 2A shows a cavity 40 in an open condition. In the cavity configuration shown in FIGS. 2A-2E, before the application of a compressive force to the cavity walls, there is no charge transferred, and thus no electric potential difference.

As shown in FIGS. 2B-2E, current i is generated using the triboelectric generator 60 by applying a cycled compressive force to one or more of cavity first and second walls 42 and 44, so that the first and second cavity walls 42 and 44 (and, therefore, electrode 120 and dielectric layer 114) will be pressed into close contact with each other, creating a closed condition of the cavity 40 as shown in FIG. 2B. In FIG. 2B, compressive forces W1 and N1 are applied to opposite walls 42 and 44 of the cavity 40 to close the cavity. Contact between the first and second cavity walls 42 and 44 results in electrons being transferred from a material (e.g., aluminum) in the positive side of the triboelectric series to a material (e.g., FEP) in the negative side in the series. Thus, in the embodiment shown in FIGS. 2B-2E, contact between second electrode 120 and the FEP first dielectric contact surface 114 (and also possible sliding contact between the electrode 120 and the dielectric layer 114) will result in electrons being transferred from the aluminum second electrode 120 to the FEP surface 114, leaving positive charges on the aluminum second electrode 120.

Referring to FIG. 2C, as the compressive force is released, the first and second walls 42 and 44 will separate due to the stored elastic energy of the housing material, thereby creating an open condition of the cavity 40. The cavity 40 will then revert back to the configuration shown in FIG. 2D, with a gap 43 formed between the walls 42 and 44. At the same time, the positive charges on the aluminum second electrode 120 attract the electrons in the opposite electrode 116 to flow through the external load 109. FIG. 2C shows a flow of positive charge carriers through the load 109.

Referring to FIG. 2D, the electric field generated by the separated surface charges will give rise to a much higher potential in the first electrode 116 than in the second electrode 120. Such a potential difference will drive a flow of positive charges from the first electrode 116 to the second electrode 120 through the external load 109 until the potential difference is fully offset by the transferred charges.

Referring to FIG. 2E, as forces are applied again to the opposed walls 42 and 44 of the cavity to force the walls toward each other, the greater positive potential on the first electrode 116 will drive the transferred positive charges back toward the second electrode 120. Thus, a cycle is achieved and the generator 60 will go back to the state depicted in FIG. 2B when the cavity 42 is closed.

Figure 3B:
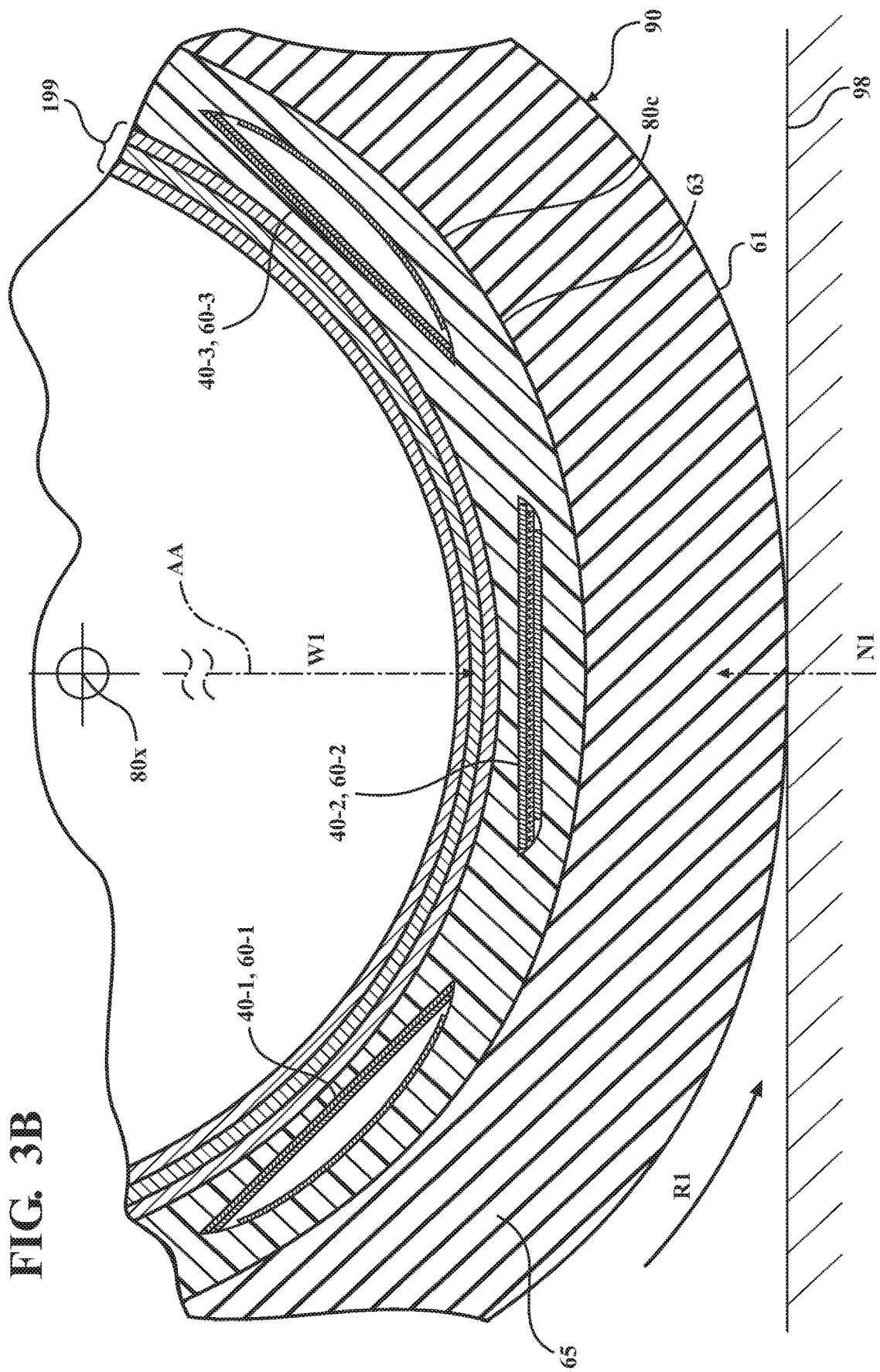

FIGS. 3A-3C are schematic views of a vehicle wheel 90 including a housing 80 having multiple angularly spaced-apart triboelectric generator cavities 40 (including cavities shown as 40-1, 40-2, 40-3, etc.) structured as previously described. Wheel 90 may include a tire 92. The tire may include an outer wall 65 with an interior surface 63 and an exterior or tread surface 61 as previously described. Housing 80 may be attached to an interior surface of the tire 92 or otherwise incorporated into the structure of the tire 92. Each cavity 40 may include an associated triboelectric generator 60 incorporated therein. FIG. 3A is a schematic cross-sectional side view showing the housing 80 incorporated into the vehicle wheel 90. The housing 80 may be in intimate contact with an interior or inner surface 63 of the tire outer wall 65. FIG. 3B is a portion of the schematic cross-sectional view of FIG. 3A, showing three triboelectric generator cavities 40-1, 40-2, and 40-3, incorporating respective triboelectric generators 60-1, 60-2, and 60-3, with the cavities located proximate the road surface 98 during rotation of the wheel 90 in direction R1. FIG. 3B shows a portion of the wheel 90 in contact with a road surface 98. FIG. 3C is a schematic edge view of the housing embodiment shown in FIG. 3B.

The housing 80 may have a central axis 80x and a radially-outermost surface or circumference defined by outer surface 80c. Central axis 80x may be coaxial with a center of the wheel 90. To incorporate the housing 80 into the vehicle wheel 90, a circumference 80c of the housing 80 may be positioned and secured in intimate contact with the inner surface 63 of the tire outer wall 65. A radially-innermost surface 80b of the housing 80 may be in intimate contact with a portion of the tire (for example, a nylon fabric layer, a rubber layer, a steel belt of the tire, etc.) (collectively designated 199 in the drawings) which is located radially inwardly of the outer wall 65 and which may normally be in intimate contact with the inner surface 63 of the outer wall 65.

The elastomeric housing 80 may contain a single cavity or a plurality of cavities, depending on the requirements of a particular application. In general, an embodiment of the housing will include a plurality of cavities as shown in FIGS. 3A-3C, with each cavity 40 having a pair of opposed walls as previously described, and each cavity being structured to actuate responsive to application of forces to the housing 80 along an associated axis extending through the cavity and between the central axis (such as axis 80x) of the housing and a circumference of the housing (such as circumference 80c).

Rotation of the wheel 90 causes each cavity 40 in the wheel 90 to alternately open and close as the portion of the wheel proximate the cavity contacts the road surface, thereby actuating the triboelectric generator 60 in the cavity as previously described. Referring to FIGS. 3A and 3B, as the wheel 90 rotates in direction R1, the walls of the cavities 40 included in the housing 80 are sequentially compressed and the cavities closed. Each cavity 40 may be structured to actuate responsive to application of one or more forces (such as forces N1 and W1) to the housing along an axis AA extending through the cavity and between the central axis 80x and the circumference 80c of the housing. The applied forces may be applied to the opposed walls of the cavity when the exterior tread surface 61 contacts the road surface.

In one or more arrangements, the applied actuation forces may be W1 representing the portion of the weight of the vehicle supported by the wheel 90 as applied through a center of the wheel, and the normal force N1 applied by the road surface 98 to support the wheel 90. The contact force N1 presses the exterior and interior surfaces of the tire radially inwardly, thereby transferring forces to walls of the cavity lying along axis AA. In particular embodiments described herein, the actuation forces may be applied along the axis AA to one or more opposed walls of the cavity when an interior surface 63 of the outer wall 65 adjacent the cavity and positioned opposite an exterior tread surface 61 of the tire which is structured to contact a road surface 98, deflects in response to the exterior tread surface 61 contacting the road surface 98.

FIG. 3B shows a cavity 40-2 which has just been closed by a combination of the force W1 and the normal force N1 applied by the road surface 98 to support the wheel 90. As the portion of the wheel 90 adjacent the cavity 40-2 contacts the road surface 98, this portion of the wheel 90 and the adjacent portion of the housing 80 are compressed, thereby compressing the walls of the adjacent cavity 40-2 and forcing the cavity into a closed condition. When the portion of the wheel 90 adjacent the cavity no longer contacts the road surface, the forces W1 and N1 no longer act through axis AA, and the cavity opens responsive to the elastic properties of the housing 80. For example, in FIG. 3B, cavity 40-3 was previously compressed by contact of the wheel 90 with the road surface 98, and has rotated to the position shown, where the cavity 40-3 has opened. Similarly, in FIG. 3B, cavity 40-1 is rotating toward the road contact position currently occupied by cavity 40-2.

Each of the cavities cycles between a closed condition (where the portion of the wheel adjacent the cavity is in contact with the road surface) and an open condition while the cavity rotates with the wheel between successive closed conditions. This cycling actuates the triboelectric generators incorporated into the cavities to execute an associated triboelectdc power generation cycle, as described herein.

As stated previously, a radially-outermost surface or circumference 80c of the housing 80 may be in intimate contact with the interior surface 63 of the tire outer wall 65. If the elastomeric housing material has force-deflection characteristics which make it "stiffer" than the rubber forming the outer wall, road contact forces acting on the outer wall may be attenuated or resisted by the relatively stiffer housing material. In this case, the housing 80 may not deflect to close the cavity 40 as desired responsive to compressive road contact forces applied to the outer wall. To help ensure that each cavity will close as desired responsive to contact between the road surface 98 and a portion of the wheel 90 adjacent the cavity, the material from which the housing 80 is formed may be selected to be at least as flexible or pliable as the rubber compound forming the tire tread. In one or more arrangements, the housing material may be more flexible (i.e., less stiff) than the wheel rubber, to ensure that the housing material will respond promptly to any forces transferred from the rubber to the walls of the cavity, by closing the cavity. This may help ensure closure of the cavities each time portions of the tire tread adjacent the cavities contact the road. As used herein, the term "elastomeric" may refer to an elastic substance occurring naturally (such as natural rubber) or produced synthetically. Examples of materials suitable for the elastomeric housing embodiments described herein include (but are not limited to) silicones, fluorosilicones, natural rubbers, polyurethanes, polybutadiene, and neoprene.

In the example previously descried, the axis AA along which the forces N1 and W1 are applied extends through the opposed walls 42 and 44 of the cavity 40. In this arrangement, the cavity may be in an open condition when the forces are not applied along the axis, and may be structured to close responsive to application of the forces along the axis. Other cavity shapes may also be used in which the axis AA along which the forces N1 and W1 are applied extends through the opposed walls of the cavity. For example, FIGS. 4A-4D show another elastomeric housing embodiment 280 incorporated into a vehicle wheel 290. Wheel 290 may include a tire 92. The tire may include an outer wall 265 with an interior surface 263 and an exterior or tread surface 261 as previously described. Housing 280 may be attached to an interior surface of the tire 292 or otherwise incorporated into the structure of the tire 292.

Figure 4A:
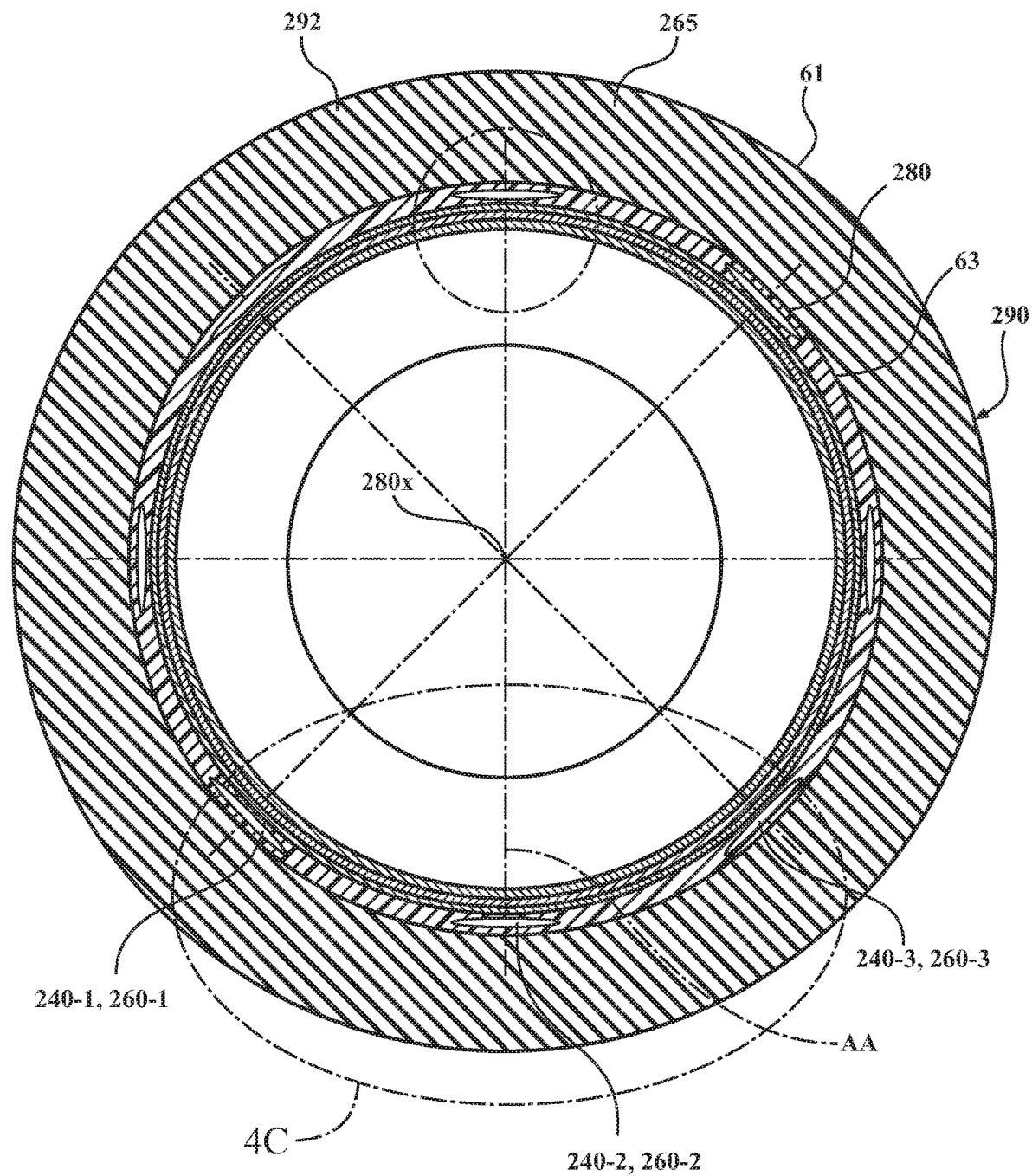
FIGS. 4A-4D are schematic views of a vehicle wheel including a housing having multiple angularly spaced-apart triboelectric generator cavities structured in accordance with another embodiment described herein.
Figure 4B:
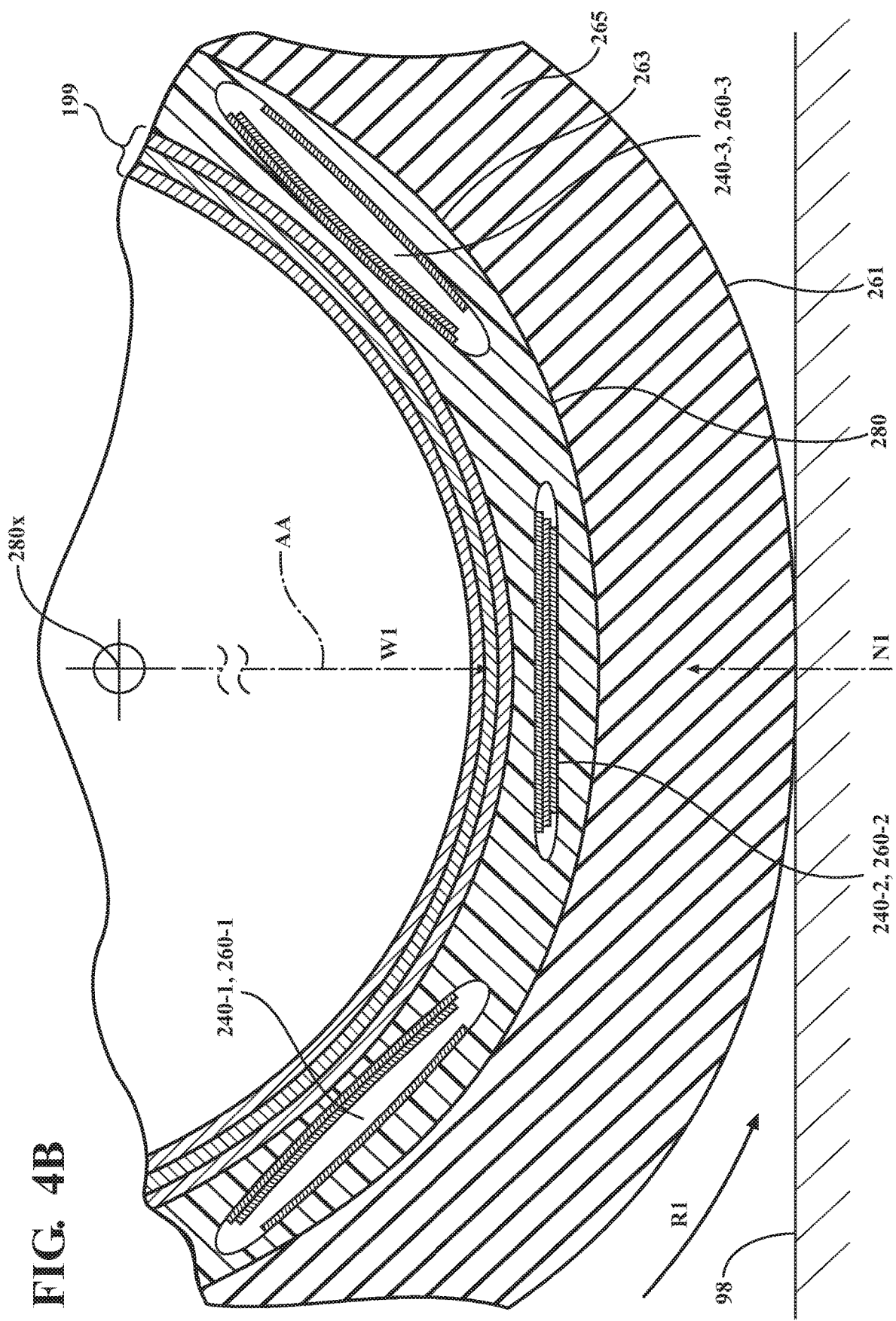
Figure 4C:
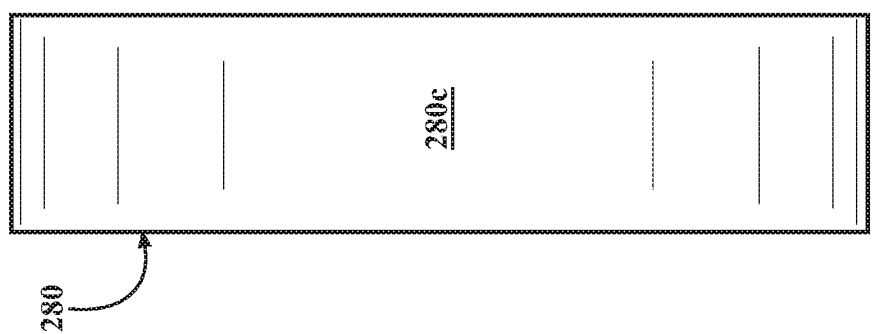
Figure 4D:
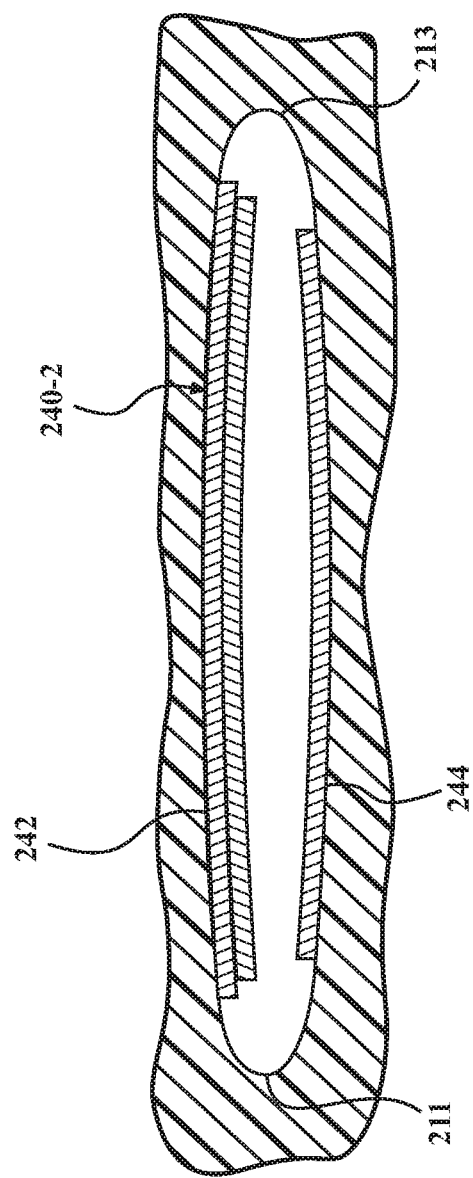

Housing 280 may include a plurality of angularly spaced-apart cavities 240 (shown as 240-1, 240-2, 240-3, etc.) having shapes similar to cavity 40 shown in FIG. 1, but with two opposed arcuately-shaped sides. Each cavity 240 may include an associated triboelectric generator 260 (i.e., generators 260-1, 260-2, 260-3) therein, as previously described. Each cavity 240 may be actuated by rotation of the housing 280 (due to rotation of a tire in which the housing is positioned), as previously described. Actuation of the cavities operates the associated triboelectric generators, to generate electrical power as described herein. FIG. 4A is a schematic cross-sectional side view showing the housing 280 incorporated into a tire 292 mountable on a vehicle wheel 290 in a manner previously described with respect to FIGS. 3A-3C. FIG. 4B is a portion of the schematic cross-sectional view of FIG. 4A, showing three triboelectric generator cavities 240-1, 240-2, and 240-3, incorporating respective triboelectric generators 260-1, 260-2, and 260-3, with the cavities located proximate the road surface 98 during rotation of the wheel 290 in direction R1. FIG. 4C is a schematic edge view of the housing shown in FIG. 4A. FIG. 4D is a detail view of an exemplary cavity incorporated into housing 280, shown in an open condition.

Rotation of the wheel 290 causes each cavity 240 in the wheel 290 to alternately open and close, thereby actuating the triboelectric generator 260 in the corresponding cavity as previously described. Referring to FIGS. 4A and 4B, as the wheel 290 rotates in direction R1, the cavities 240 included in the housing 280 are sequentially compressed and actuate in the same manner as previously described with regard to the embodiment shown in FIGS. 3A-3D. FIG. 4B shows a cavity 240-2 which has just been closed by a combination of the force W1 and the normal force N1 applied by the road surface 98 to support the wheel 290. In addition, cavity 240-3 was previously compressed by contact of the wheel 290 with the road surface 98, and has rotated to the position shown, where the cavity 240-3 has opened. Similarly, cavity 240-1 is rotating toward the road contact position currently occupied by cavity 240-2.

Each of the cavities 240 cycles between a closed condition (where the portion of the wheel adjacent the cavity is in contact with the road surface) and an open condition, while the cavity rotates with the wheel between successive closed conditions. This cycling actuates all of the triboelectric generators 260 incorporated into the cavities 240, to execute an associated triboelectric power generation cycle as described herein.

FIGS. 5A-5D show a wheel 190 including an elastomeric housing 180 incorporating one or more cavities 140 having rectangular shapes. The housing embodiment 180 includes a plurality of angularly spaced-apart rectangular cavities 140. Each cavity 140 may include a triboelectric generator therein, as previously described. Each cavity 140 may be actuated by rotation of the housing (due to rotation of a tire in which the housing is positioned) as previously described. Actuation of the cavities operates the associated triboelectric generators, to generate electrical power as described herein.

Wheel 190 may include a tire 192. The tire may include an outer wall 165 with an interior surface 163 and an exterior or tread surface 161 as previously described. Housing 180 may be attached to an interior surface of the tire 192 or otherwise incorporated into the structure of the tire 192.

Figure 5A:
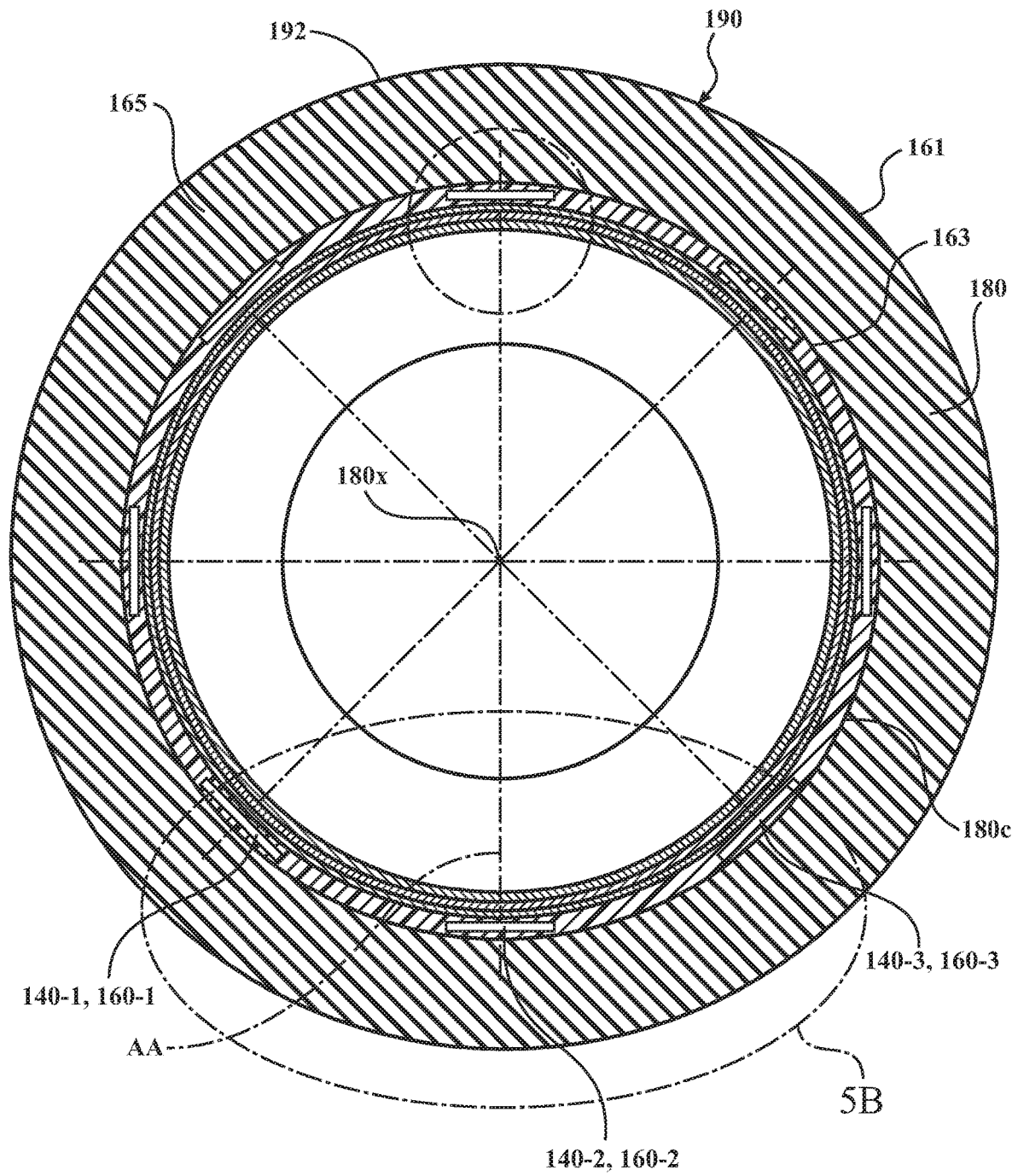
FIGS. 5A-5D are schematic views of a vehicle wheel including a housing having multiple angularly spaced-apart triboelectric generator cavities structured in accordance with another embodiment described herein.
Figure 5B:
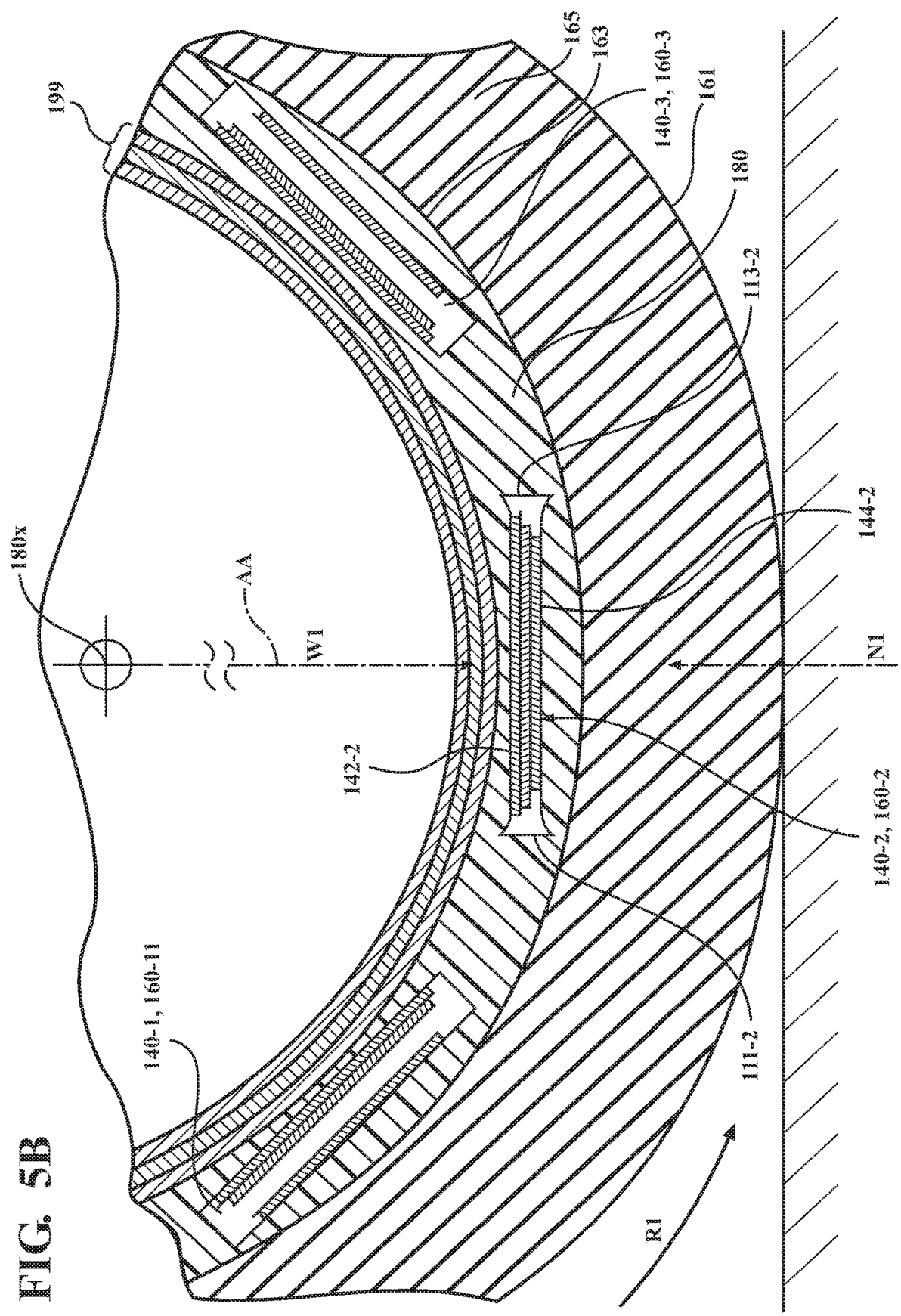
Figure 5C:
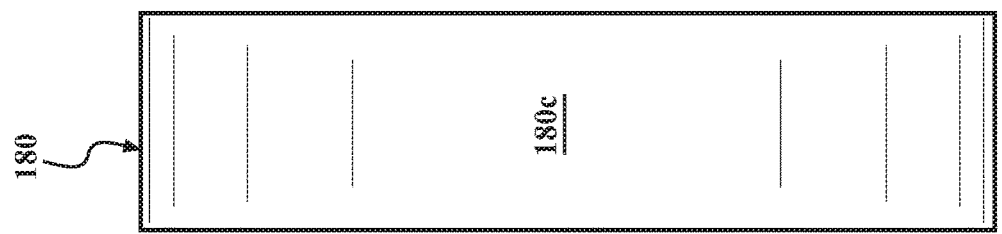
Figure 5D:
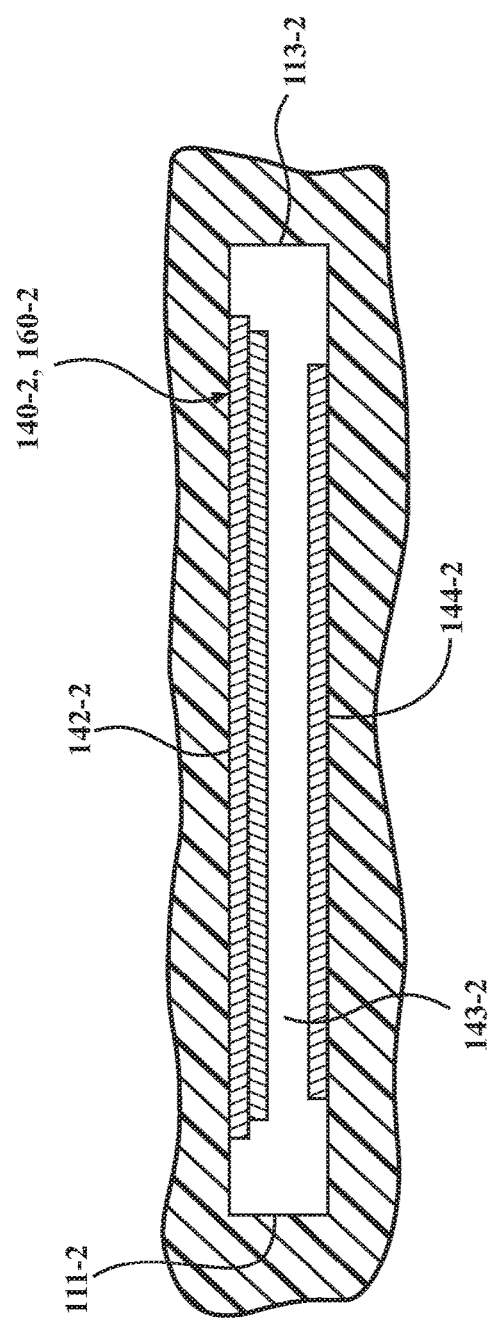

FIG. 5A is a schematic cross-sectional side view showing the housing 180 incorporated into a tire 192 mountable on a vehicle wheel 190. FIG. 5B is a portion of schematic cross-sectional view of FIG. 5A, showing three of the triboelectric generator cavities 140-1, 140-2, and 140-3, incorporating respective triboelectric generators 160-1, 160-2, and 160-3, with the cavities located proximate the road surface 98 during rotation of the wheel 190 in direction R1. FIG. 5C is a schematic edge view of the housing shown in FIG. 5A. FIG. 5D is a magnified view of the cavity 140-2 in an open condition.

Rotation of the wheel 190 causes each cavity 140 in the wheel 190 to alternately open and close, thereby actuating the triboelectric generator 160 in the corresponding cavity as previously described. Referring to FIGS. 5A and 5B, as the wheel 190 rotates in direction R1, the cavities 140 included in the housing 180 are sequentially compressed and actuate in the same manner as previously described with regard to the embodiment shown in FIGS. 3A-3D.

FIG. 5B shows a cavity 140-2 which has just been closed by a combination of the force W1 and the normal force N1 applied by the road surface 98 to support the wheel 190. In addition, cavity 140-3 was previously compressed by contact of the wheel 190 with the road surface 98, and has rotated to the position shown, where the cavity 140-3 has opened. Similarly, cavity 140-1 is rotating toward the road contact position currently occupied by cavity 140-2. Each of the cavities 140 cycles between a closed condition (where the portion of the wheel adjacent the cavity is in contact with the road surface) and an open condition, while the cavity rotates with the wheel between successive closed conditions. This cycling actuates the triboelectric generators 160-1 through 160-3 incorporated into the cavities 140-1 through 140-3, to execute an associated triboelectric power generation cycle as described herein.

FIGS. 6A-6D show another housing embodiment 380 including a plurality of cavities 340. Each cavity 340 may have the structure shown in FIG. 1, with a straight side and an arcuate side opposite the straight side. Each cavity 340 may include a triboelectric generator therein, as previously described. Each cavity 340 may be actuated by rotation of the housing (due to rotation of a tire in which the housing is positioned) as previously described. Actuation of the cavities operates the associated triboelectric generators, to generate electrical power as described herein.

FIG. 6A is a schematic side cross-sectional view showing the housing 380 incorporated into a vehicle wheel 390. Wheel 390 may include a tire 392. The tire may include an outer wall 365 with an interior surface 363 and an exterior or tread surface 361 as previously described. Housing 380 may be attached to an interior surface of the tire 392 or otherwise incorporated into the structure of the tire 392.

Figure 6B:
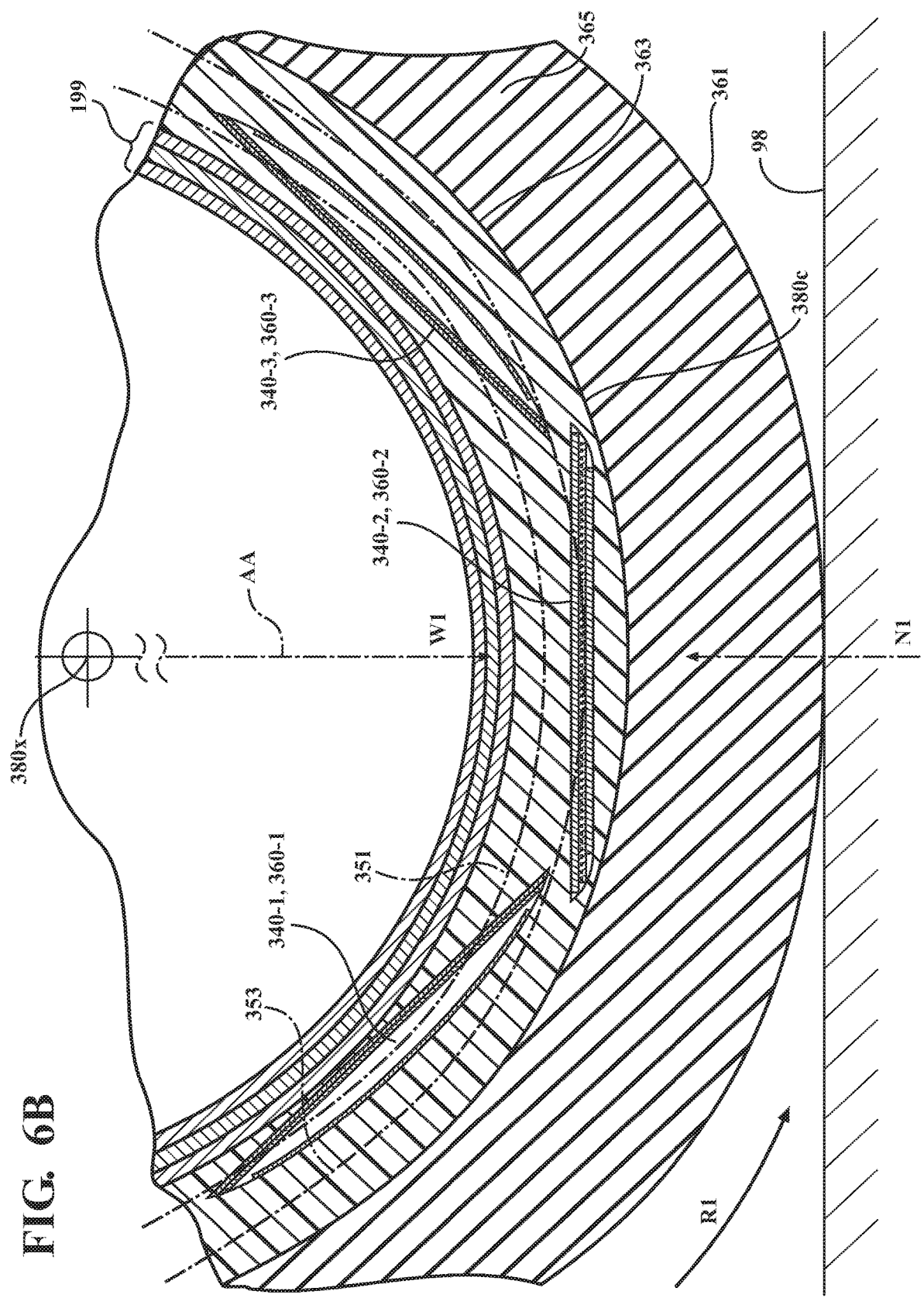

FIG. 6B is a portion of schematic cross-sectional view of FIG. 6A, showing three triboelectric generator cavities 340-1, 340-2, and 340-3 incorporating respective triboelectric generators 360-1, 360-2, and 360-3, with the cavities located proximate the road surface 98 during rotation of the wheel 390 in direction R1. FIG. 6C is the schematic cross-sectional view of FIG. 6B, showing the triboelectric generator cavities 340-1 and 340-2 after further rotation of the wheel 390. FIG. 6D is a schematic edge view of the housing shown in FIG. 6A.

In the embodiment shown in FIGS. 6A-6D, cavities 340 are positioned in two rows 351 and 353 which are radially spaced-apart from each other. The cavities in a first row 351 may be reside at a first radial distance D1 from a center 380x of the housing 380, while the cavities in a second row 353 may reside at a second radial distance D2 from the housing center. D2 may be greater than D1. In the embodiment shown, cavities 340-1 and 340-3 are positioned along first row 351 and cavity 340-2 is positioned along second row 353. The cavities in each of rows 351 and 353 are also angularly spaced-apart from each other. For example, cavity 340-2 is angularly spaced-apart from cavity 340-1, and cavity 340-3 is angularly spaced-apart from cavity 340-2 as shown in FIG. 6B.

Rotation of the wheel 390 causes each cavity 340 in the wheel 390 to alternately open and close, thereby actuating the triboelectric generator 360 in the corresponding cavity as previously described. Referring to FIGS. 6A-6C, as the wheel 390 rotates in direction R1, the cavities 340 included in the housing 380 are sequentially compressed and actuate in the same manner as previously described with regard to the embodiment shown in FIGS. 3A-3D. FIG. 6B shows cavity 340-2 which has just been closed by a combination of the force W1 and the normal force N1 applied along the axis AA. In addition, cavity 340-3 was previously compressed by contact of the wheel 390 with the road surface 98, and has rotated to the position shown, where the cavity 340-3 has opened. Similarly, cavity 340-1 is rotating toward the road contact position currently occupied by cavity 340-2.

In FIG. 6C, cavity 340-1 has rotated so that the forces W1 and N1 operating along the axis AA now pass through the opposed walls of the cavity 340-1, thereby forcing the cavity to close and actuating a triboelectric power generation cycle for the triboelectric generator positioned in the cavity 340-1. This closing and opening of the cavities during rotation of the wheel 390 proceeds for all cavities successively as the wheel rotates. The radially-staggered arrangement shown provides one method of increasing the number of cavities incorporated into the elastomeric housing. Increasing the number of cavities may correspondingly increase the power generating capacity of the housing.

In alternative embodiments, one or more of the housing cavities may be oriented so that the axis AA extends through opposed ends of the cavity. In these arrangements, the cavity may be in a closed condition when the forces N1 and W1 are not applied along the axis, and may be structured to open responsive to application of the forces to the ends of the cavity and along the axis. An example of such an alternative embodiment is shown in FIGS. 7A-7C.

Figure 7A:
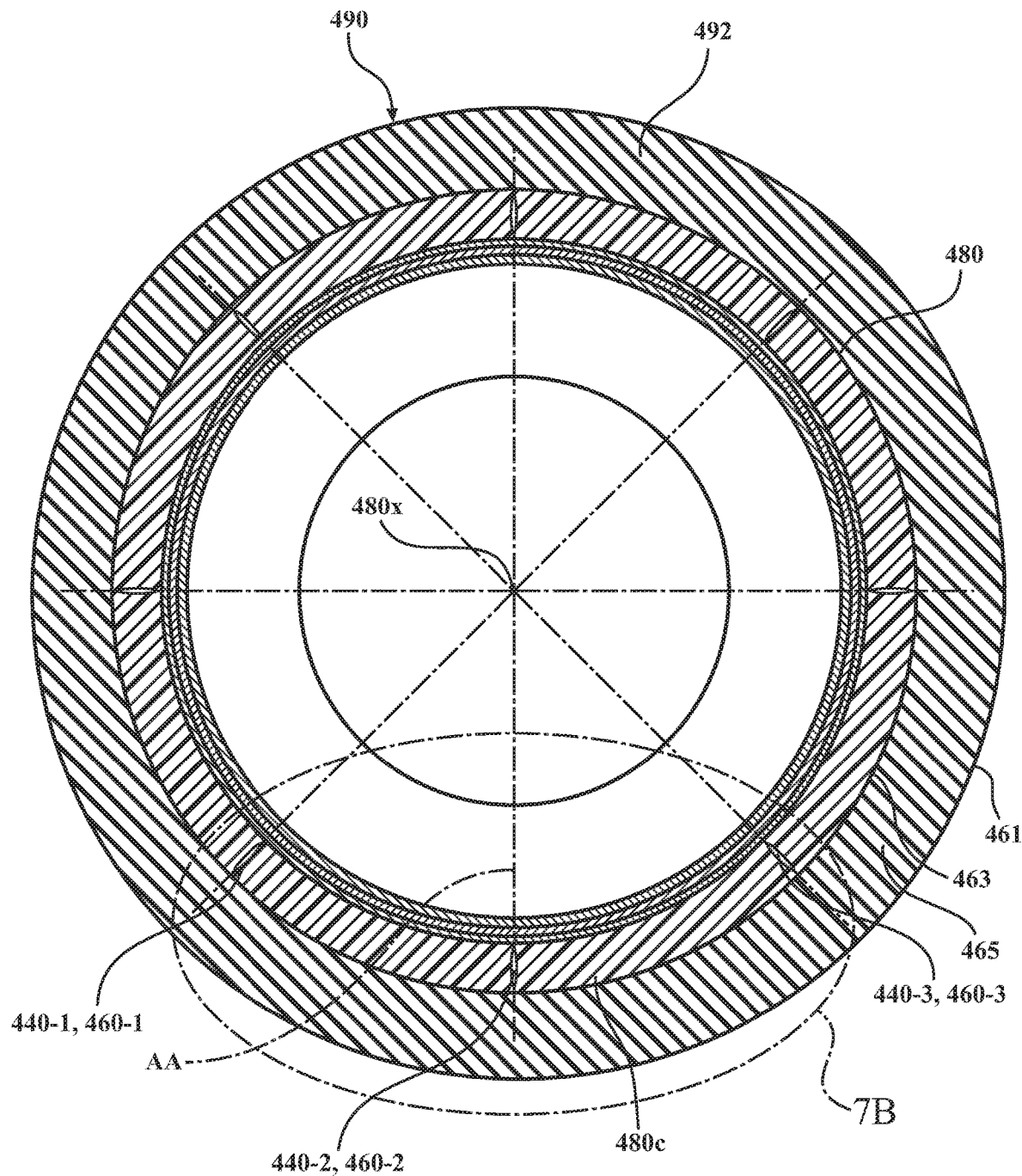
FIGS. 7A-7D are schematic views of a vehicle wheel including a housing having multiple angularly spaced-apart triboelectric generator cavities structured in accordance with another embodiment described herein.
Figure 7B:
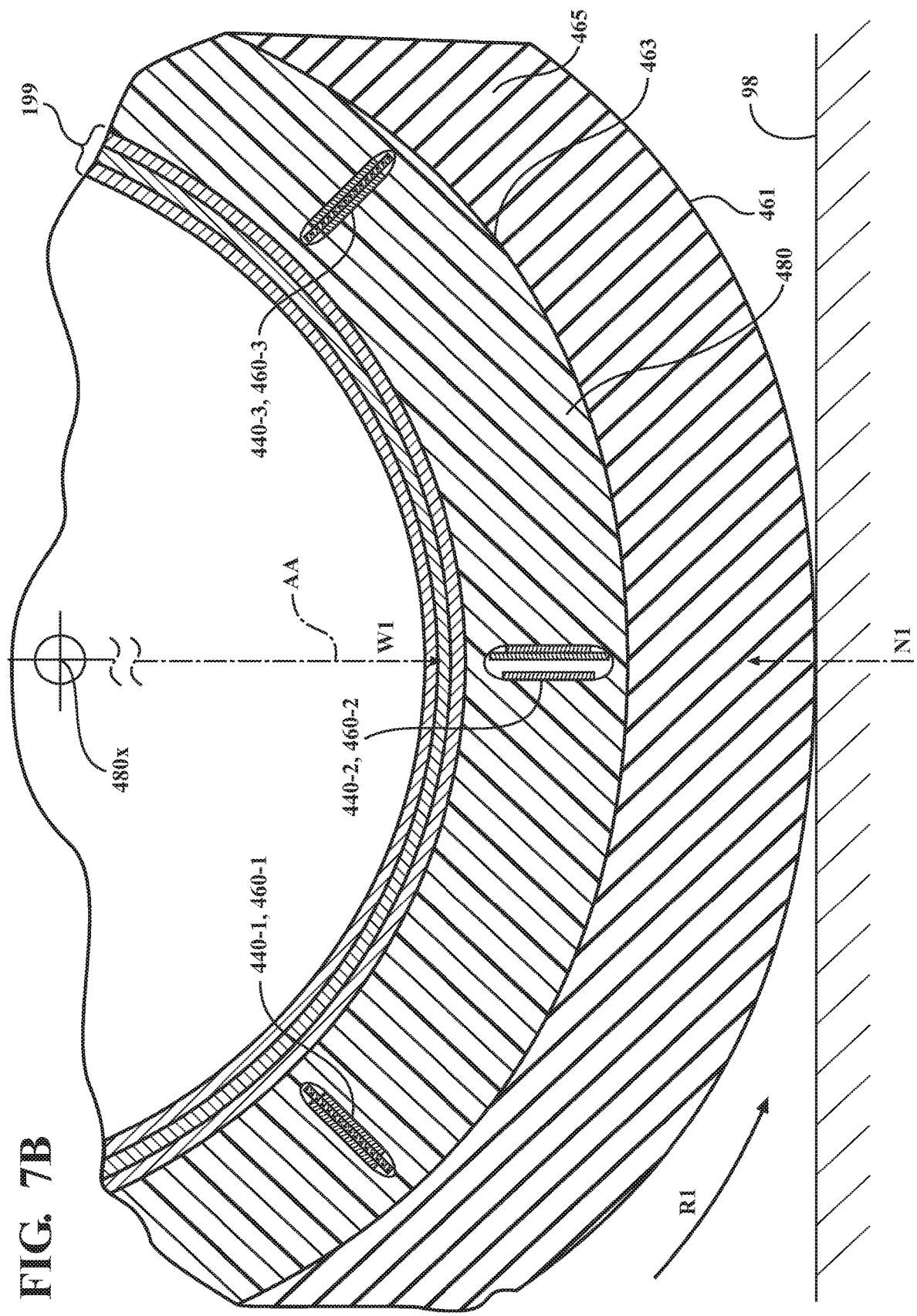
Figure 7D:
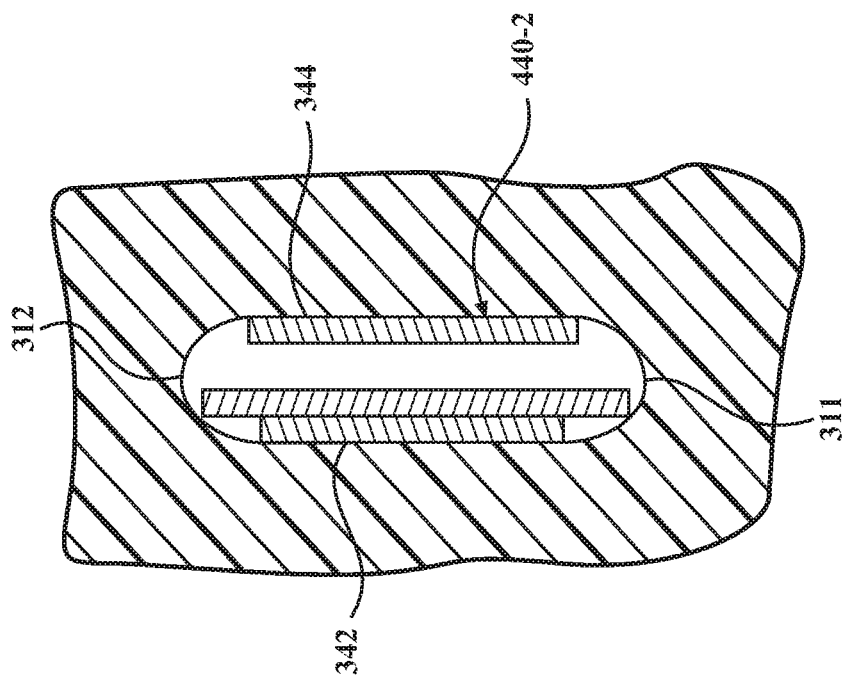
Figure 7C:
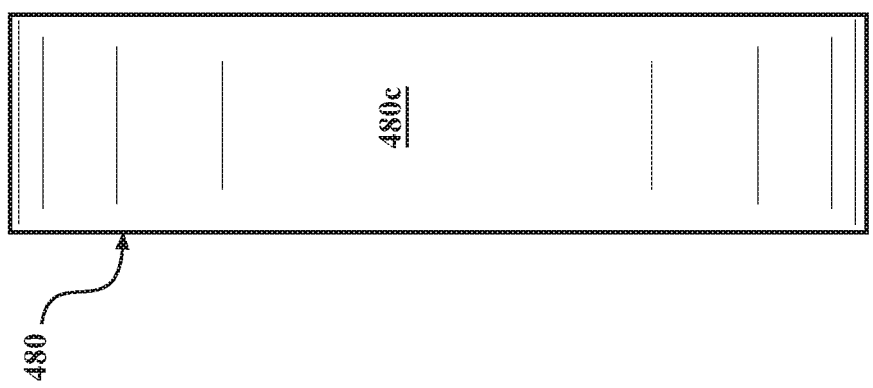

In an embodiment as shown in FIG. 1 or FIGS. 7A-7B, an end of a cavity may be taken as a location where ends of opposed walls of the cavity intersect. For example, in the cavity shown in FIG. 1 where the ends of the cavity intersect at opposed sharp corners 40r and 40t, the opposed ends of the cavity may be taken as 40r and 40t. In an embodiment as shown in FIGS. 5A-5D where opposite walls of a rectangular cavity are connected at their ends by straight segments, the ends of the cavity may be taken as the straight segments 111-2 and 113-2 as shown in FIG. 5D. Thus, an axis passing through the ends of the cavity may pass through the straight segments. In an embodiment as shown in FIGS. 4A and 4B where radii or curved portions connect the ends of the opposed walls, the ends of the cavity may be taken as the curved portions 211 and 213. Thus, an axis passing through the ends of the cavity may pass through the curved portions or through the centers of the radii forming the cavity ends. For example, an axis passing through cavity 440-2 in FIG. 7B may pass through cavity ends 311 and 312 (FIG. 7D).

FIGS. 7A-7D show another housing embodiment 480 including a plurality of the cavities 440. Each cavity 440 may include a triboelectric generator therein, as previously described. Each cavity 440 may be actuated by rotation of the housing (due to rotation of a tire in which the housing is positioned) as previously described. Actuation of the cavities operates the associated triboelectric generators, to generate electrical power as described herein.

FIG. 7A is a schematic side cross-sectional view showing the housing 480 incorporated into a vehicle wheel 490. Wheel 490 may include a tire 492. The tire may include an outer wall 465 with an interior surface 463 and an exterior or tread surface 461 as previously described. Housing 480 may be attached to an interior surface of the tire 492 or otherwise incorporated into the structure of the tire 492.

Cavities 440 may be formed as slits or cuts in the material of the housing 480. Thus, in order for triboelectric materials to be deposited on the walls of the cavities 440, forces may need to be applied to the ends of the cavities as described herein to force the cavities open. As in the previously described embodiments, each cavity 440 may be actuated by rotation of the housing (due to rotation of a tire in which the housing is positioned). Actuation of the cavities operates the associated triboelectric generators, to generate electrical power as described herein.

FIG. 7B is a portion of schematic cross-sectional view of FIG. 7A, showing three triboelectric generator cavities 440-1, 440-2, and 440-3, incorporating respective triboelectric generators 460-1, 460-2, and 460-3, with the cavities located proximate the road surface 98 during rotation of the wheel 490 in direction R1. FIG. 7C is a schematic edge view of the housing shown in FIG. 7A. FIG. 7D is a detail view of cavity 440-2 in a closed condition, showing the general structure of the cavities 440.

The cavities 440 are angularly spaced-apart from each other. Rotation of the wheel 490 causes each cavity 440 in the wheel 490 to alternately open and close, thereby actuating the triboelectric generator 460 in the corresponding cavity as previously described. Referring to FIGS. 7A-7D, as the wheel 490 rotates in direction R1, the cavities 440 included in the housing 480 are sequentially compressed and actuate in the same manner as previously described with regard to the embodiment shown in FIGS. 3A-3D.

FIG. 7B shows cavity 440-2 which has just been opened by a combination of the force W1 and the normal force N1 applied along the axis AA, to the ends of the cavity. In addition, cavity 440-3 was previously compressed by contact of the wheel 490 with the road surface 98, and has rotated to the position shown, where the cavity 440-3 has closed. Similarly, cavity 440-1 is rotating toward the road contact position currently occupied by cavity 440-2. The closing and opening of the cavities during rotation of the wheel 490 proceeds for all cavities successively as the wheel rotates.

Figures 8A, 8B:
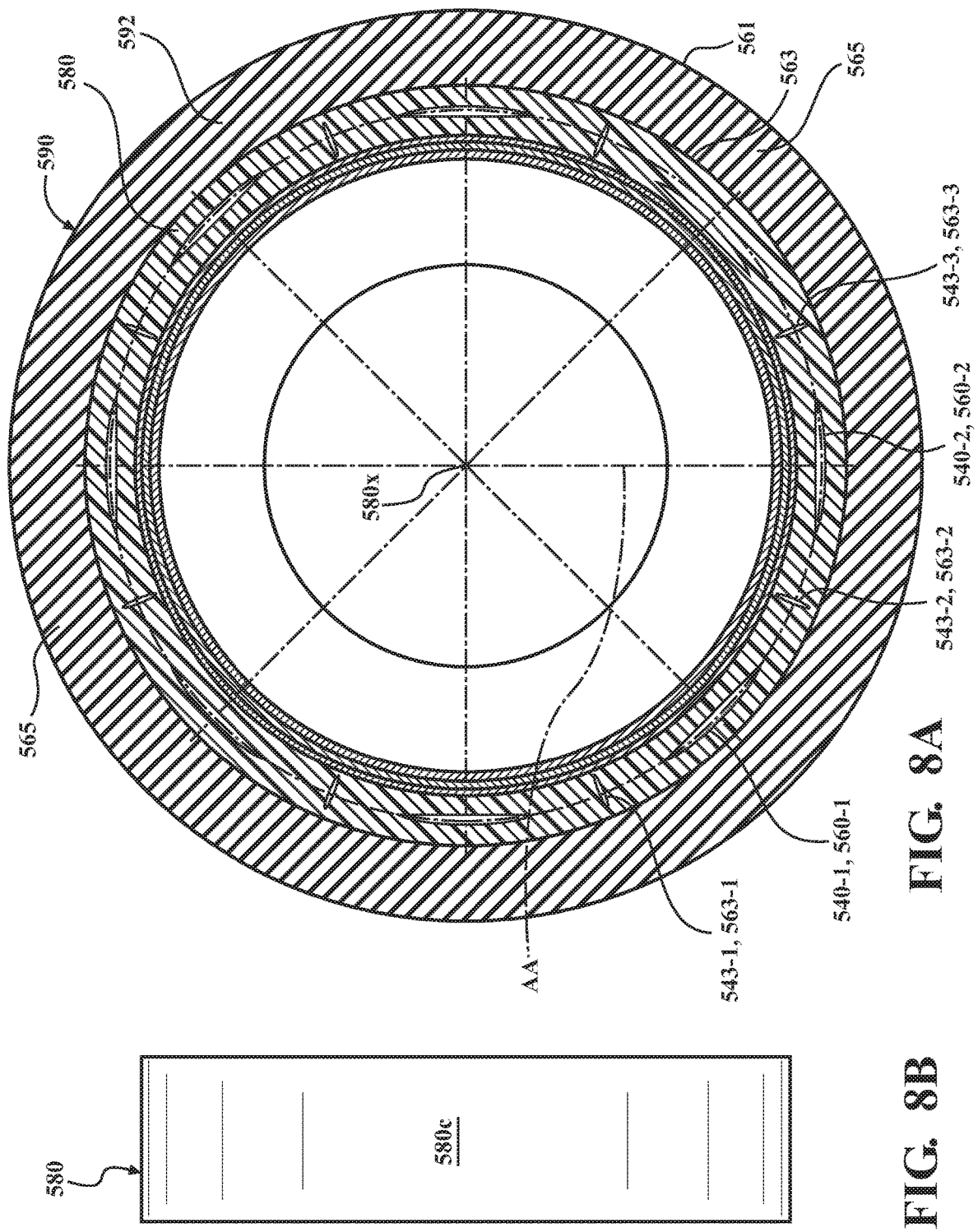
FIGS. 8A-8B are schematic views of a vehicle wheel including a housing having multiple angularly spaced-apart triboelectric generator cavities structured in accordance with another embodiment described herein.

Referring to FIGS. 8A-8B, in another embodiment, an elastomeric triboelectric generator housing 580 may include one or more angularly spaced-apart cavities 540 (for example, including cavities 540-1, 540-2, 540-3, etc.) incorporating respective triboelectric generators 560-1, 560-2, and 560-3. The cavities 540 may be structured the same as cavities 40 shown in FIGS. 3A-3C. In addition, housing 580 may include one or more additional angularly spaced-apart cavities 543 (for example, including cavities 543-1, 543-2, 543-3, etc.) incorporating respective triboelectric generators 563-1, 563-2, and 563-3. The cavities 543 may be structured the same as cavities 440 shown in FIGS. 8A-8B. The cavities 543 may be interspersed as shown between pairs of adjacent ones of cavities 540.

FIG. 8A is a schematic side cross-sectional view showing the housing 580 incorporated into a vehicle wheel 590. Wheel 590 may include a tire 592. The tire may include an outer wall 565 with an interior surface 563 and an exterior or tread surface 561 as previously described. Housing 580 may be attached to an interior surface of the tire 592 or otherwise incorporated into the structure of the tire 592.

Operation of the cavities 540 during rotation of the wheel 590 is as previously described with regard to FIGS. 3A-3C, and operation of the cavities 543 during rotation of the wheel is as previously described with regard to FIGS. 7A-7D. The alternating arrangement of the cavities 540 and 543 shown provides another method of increasing the number of cavities incorporated into the elastomeric housing. Increasing the number of cavities may correspondingly increase the power generating capacity of the housing.

FIGS. 9A-9D show another embodiment 680 of a triboelectric generator housing similar to the embodiment shown in FIGS. 9A-9D. FIGS. 9A-9D show a wheel 690 including a housing 680 incorporating one or more cavities 640 having rectangular shapes. FIG. 9A is a schematic cross-sectional view showing the housing 180 incorporated into a tire 692 mountable on a vehicle wheel 690. The housing embodiment 680 includes a plurality of angularly spaced-apart rectangular cavities 640 (shown as cavities 640-1, 640-2, 640-3, etc.), the cavities 640 incorporating respective triboelectric generators 660-1, 660-2, 660-3, etc. Each cavity 640 may be actuated by rotation of the housing 680 (due to rotation of a tire in which the housing is positioned) as previously described. Actuation of the cavities 640 operates the associated triboelectric generators 660, to generate electrical power as described herein. FIG. 9B is a detail view of a cavity 640-2 incorporated into the housing 680. The cavity in FIG. 9b is in the open condition. FIG. 9B is a detail view of the cavity 640-2 shown in an open condition. FIG. 9C is a portion of schematic cross-sectional view of FIG. 9A, showing three triboelectric generator cavities 640-1, 640-2, and 640-3, incorporating respective triboelectric generators 660-1, 660-2, and 660-3, with the cavities located proximate the road surface 98 during rotation of the wheel 690 in direction R1. FIG. 9D is a schematic edge view of the housing shown in FIG. 9A.

In this embodiment, the generator housing 680 may include one or more relatively rigid force transmission members. The particular embodiment shown includes a pair of force transmission members, 635 and 637, molded or inserted into the housing 680 between the cavity 640-2 and the exterior surface 680c of the housing 680. The force transmission members 635 and 637 may be positioned spaced apart along an exterior of the cavity and have first end portions 635a and 637a positioned adjacent and just outside a wall of the cavity. The force transmission members 635 and 637 may also have second end portions 635b and 637b positioned adjacent, and just inside, the exterior surface 680c of the housing 680.

The force transmission members 635 and 637 may be structured to aid in transmitting road contact forces to the cavity walls closest to the tire tread. This may aid in providing the desired deflection of the cavity walls, for example, when the rubber forming the tire tread is relatively stiff or when the cavities (such as cavities located along first row 351 of FIGS. 6A-6D are located at a relatively greater distance from the interior surface of the tire tread. When using the force transmission members, there is less reliance on the relatively more flexible material of the housing 680 to transmit the forces required for cavity actuation. The force transmission members may be formed from any suitable material and may have a shape or structure suitable for any particular application.

FIGS. 10A-10D show a wheel 790 including another embodiment of a triboelectric generator housing 780 similar to the embodiment shown in FIGS. 6A-6D. Housing 780 has cavities 740 (including cavities 740-1, 740-2, and 740-3) incorporating respective triboelectric generators 760-1, 760-2, and 760-3 similar to the cavities and triboelectric generators described with regard to FIGS. 6A-6D.

Figures 10A, 10D:
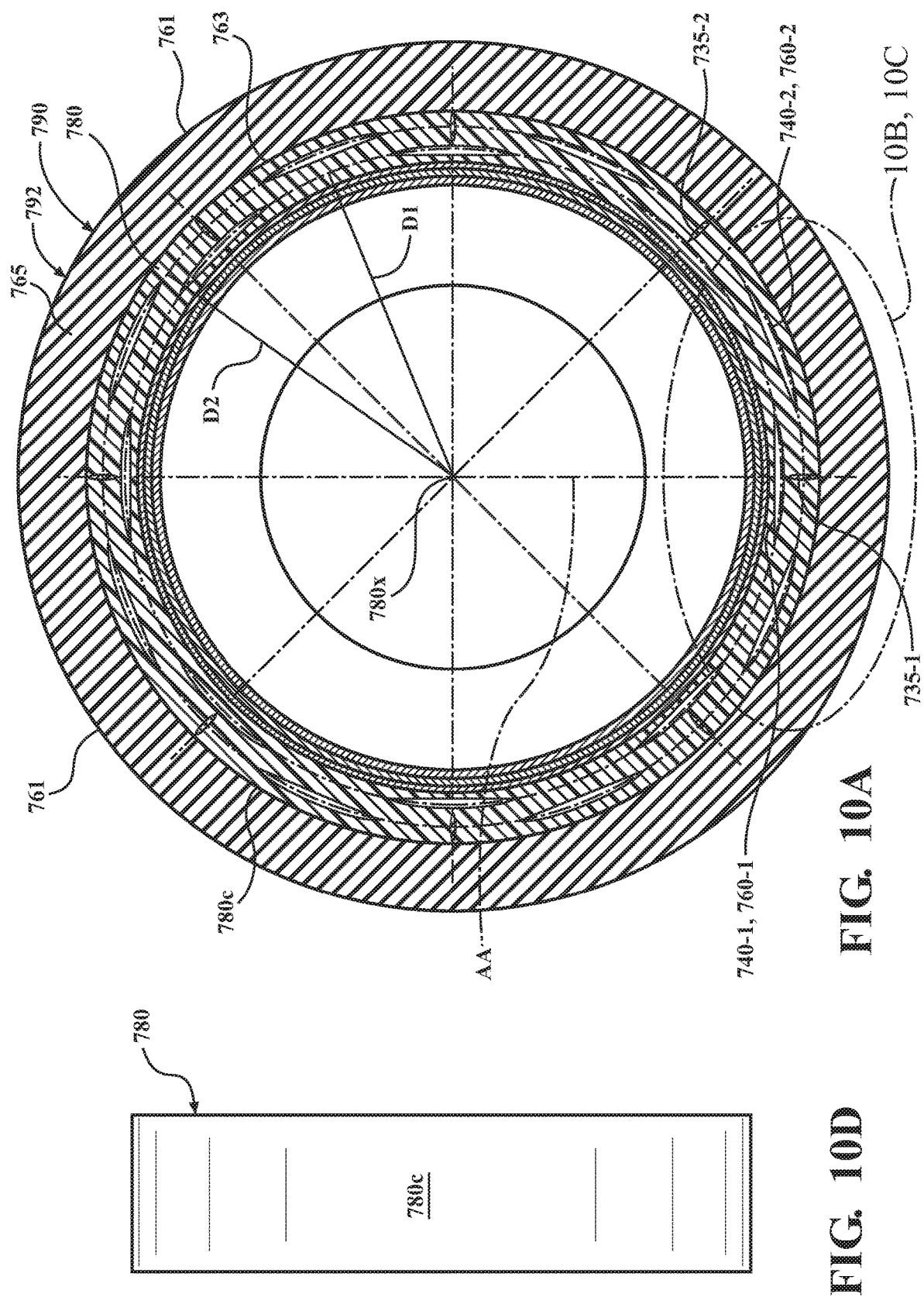
FIGS. 10A-10D are schematic views of a vehicle wheel including a housing having multiple angularly spaced-apart triboelectric generator cavities structured in accordance with another embodiment described herein.
Figure 10B:
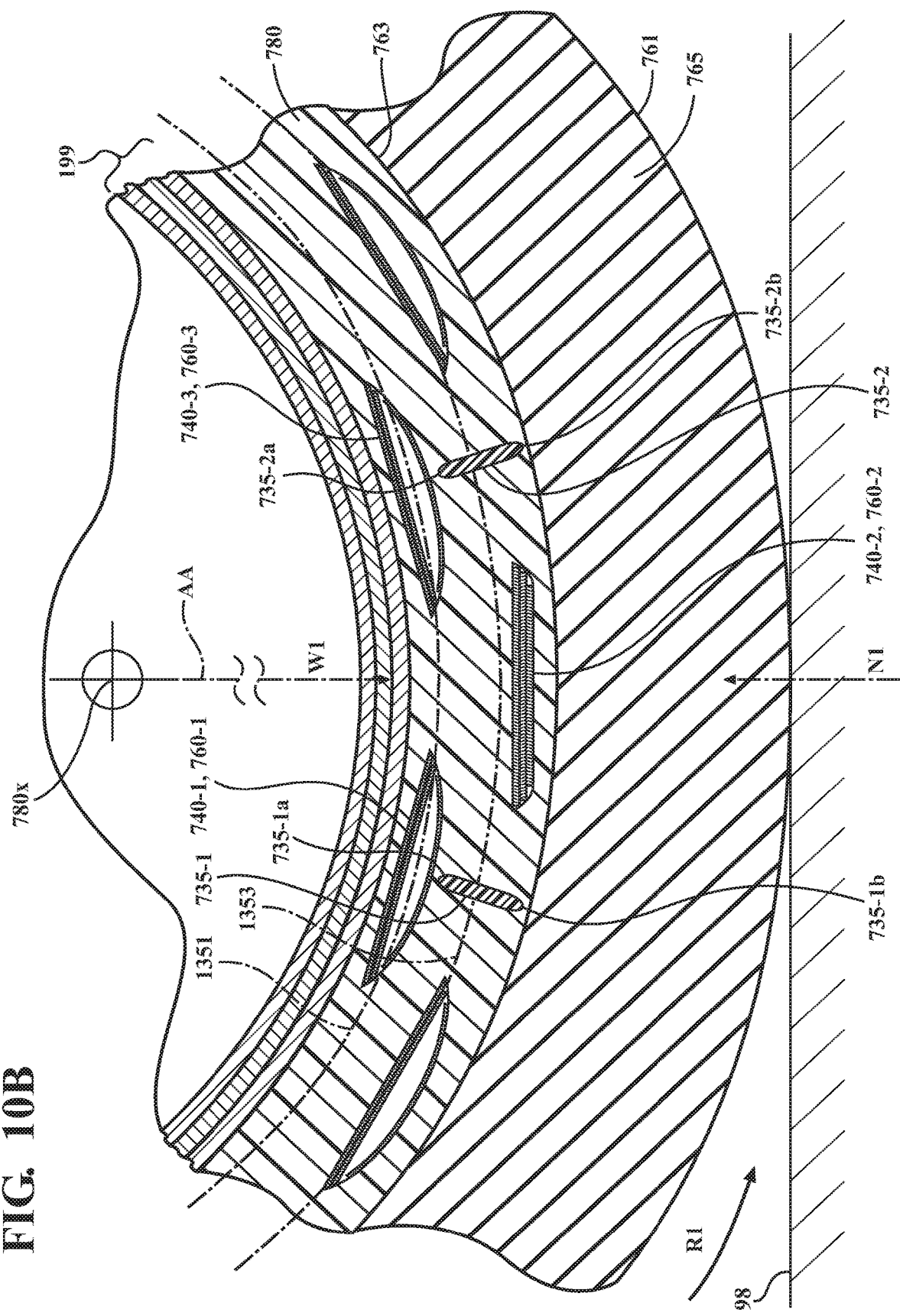
Figure 10C:
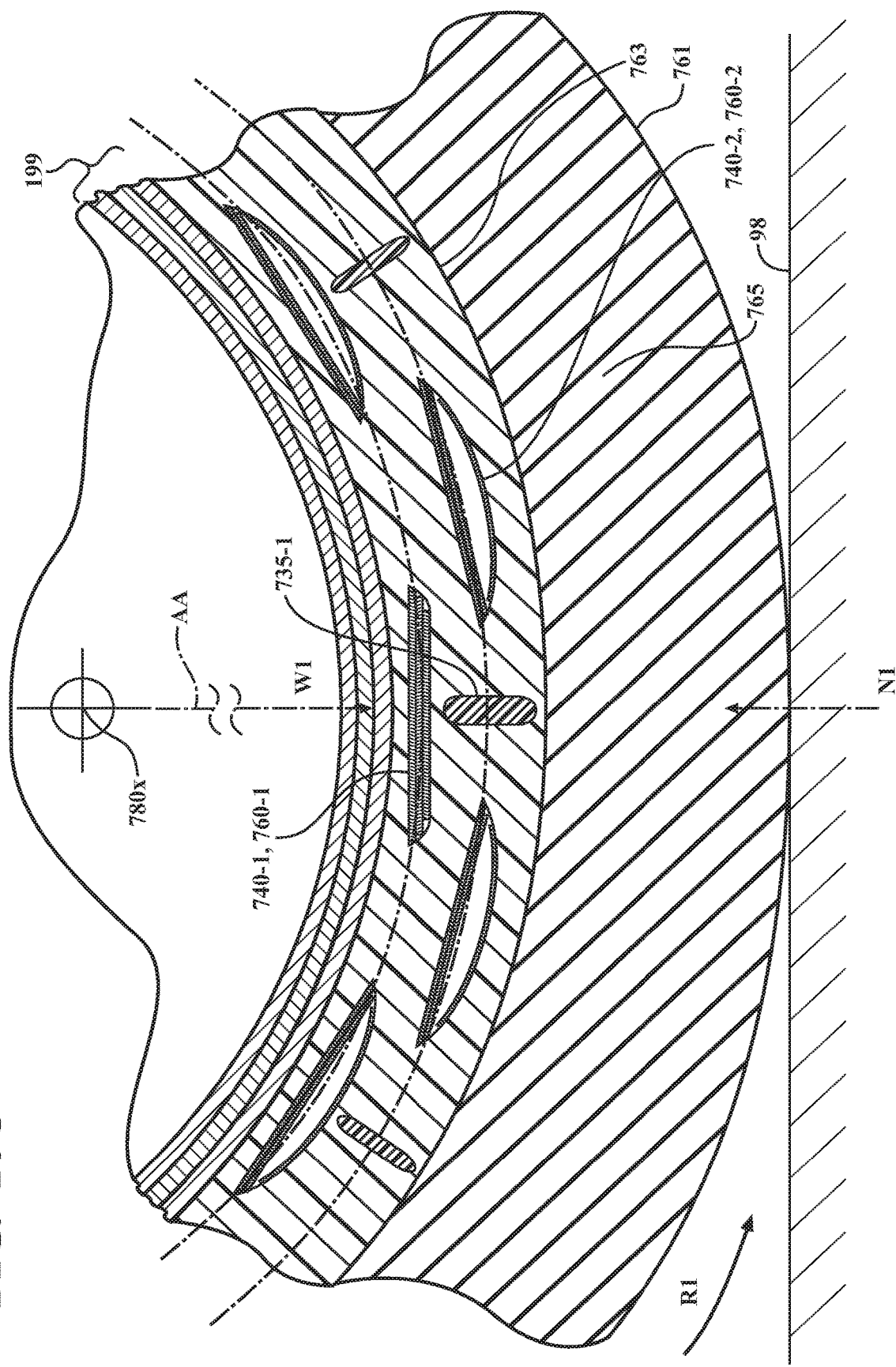

FIG. 10A is a schematic cross-sectional view showing the housing 780 incorporated into a vehicle wheel 790. FIG. 10B is a portion of schematic cross-sectional view of FIG. 10A, showing the three triboelectric generator cavities 740-1, 740-2, and 740-3 located proximate the road surface 98 during rotation of the wheel 790 in direction R1. FIG. 10C is the schematic cross-sectional view of FIG. 10B, showing the triboelectric generator cavities 740-1 and 740-2 after further rotation of the wheel 790. FIG. 10D is a schematic edge view of the housing shown in FIG. 10A.

In the embodiment shown in FIGS. 10A-10D, cavities 740 are positioned in two rows 1351 and 1353 which are radially spaced-apart from each other. The cavities in a first row 1351 may be reside at a first radial distance D1 from a center 780x of the housing 780, while the cavities in a second row 1353 may reside at a second radial distance D2 from the housing center. D2 may be greater than D1. In the embodiment shown, cavities 740-1 and 740-3 are positioned along first row 1351 and cavity 740-2 is positioned along second row 1353. The cavities in each of rows 1351 and 1353 are also angularly spaced-apart from each other. For example, cavity 740-2 is angularly spaced-apart from cavity 740-1, and cavity 740-3 is angularly spaced-apart from cavity 740-2 as shown in FIG. 10B.

Rotation of the wheel 790 causes each cavity 740 in the wheel 790 to alternately open and close, thereby actuating the triboelectric generator 760 in the corresponding cavity as previously described. Referring to FIGS. 10A-10C as the wheel 70 rotates in direction R1, the cavities 740 included in the housing 780 are sequentially compressed and actuate in the same manner as previously described with regard to the embodiment shown in FIGS. 6A-6D. FIG. 10B shows cavity 740-2 which has just been closed by a combination of the force W1 and the normal force N1 applied along the axis AA extending from a center of the wheel through the exterior tread surface of the tire. In addition, cavity 740-3 was previously compressed by contact of the wheel 790 with the road surface 98, and has rotated to the position shown, where the cavity 740-3 has opened. Similarly, cavity 740-1 is rotating toward the road contact position currently occupied by cavity 740-2.

In FIG. 10C, cavity 740-1 has rotated so that the forces W1 and N1 operating along the axis AA now pass through the opposed walls of the cavity 740-1, thereby forcing the cavity to close and actuating a triboelectric power generation cycle for the triboelectric generator positioned in the cavity 740-1. This closing and opening of the cavities during rotation of the wheel 790 proceeds for all cavities successively as the wheel rotates. The radially-staggered arrangement shown provides one method of increasing the number of cavities incorporated into the elastomeric housing. Increasing the number of cavities may correspondingly increase the power generating capacity of the housing.

In addition, housing 780 includes relatively rigid force transmission members 735 molded or inserted into the housing to aid in transmitting road contact forces as previously described to the cavities positioned along first row 1351, which are spaced relatively farther away from the tire tread 761. The force transmission members 735 (shown in FIGS. 10A-10D as 735-1, 735-2, etc.) may be positioned spaced apart along an exterior of an associated cavity and may have first end portions (such as 735-1a) positioned adjacent and just outside a wall of the associated cavity (such as cavity 735-1). The force transmission members 735 may also have second end portions (such as 735-1b) positioned adjacent, and just inside, the exterior surface 780c of the housing 780. The force transmission members 735 may operate as previously described to aid in providing the desired deflection of the walls of the cavities residing along row 1351.

The elastomeric triboelectric generator housing embodiments described herein include various numbers of cavities and associated triboelectric generators. However, embodiments of the housing may include any desired number of cavities, depending on such factors as tire size, cavity arrangement, cavity size, and other pertinent factors.

Figure 11:
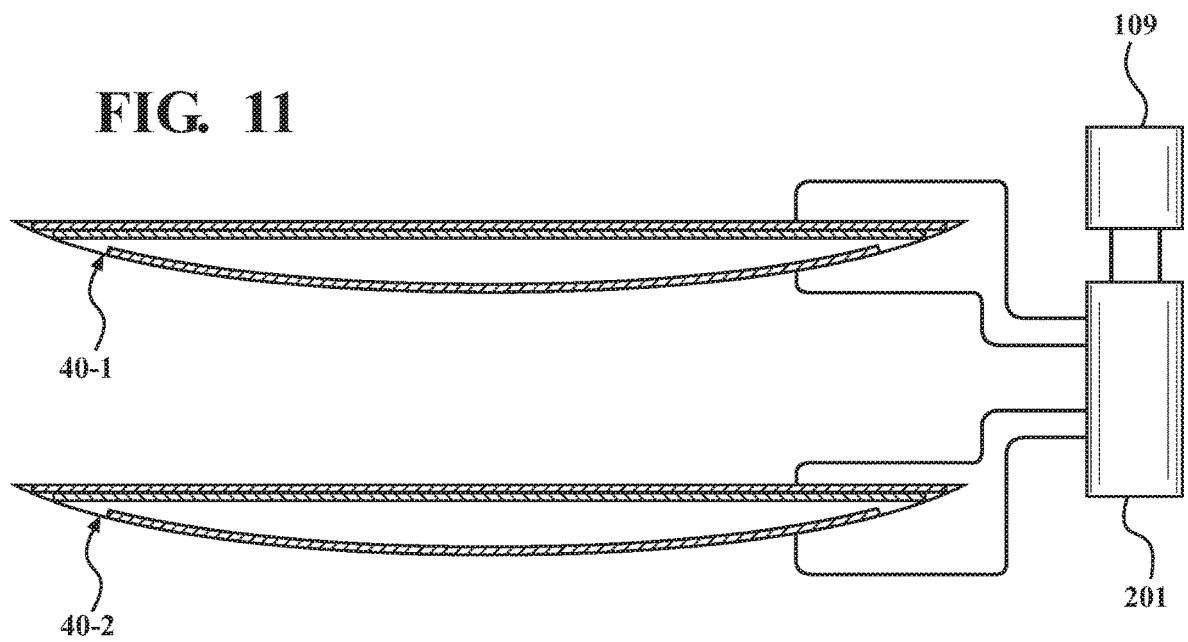
FIG. 11 is a schematic view of a one embodiment of a power management circuit electrically coupled to multiple triboelectric generators in accordance with an embodiment described herein.

Referring to FIG. 11, any number of triboelectric generators in associated cavities in a housing may be electrically connected in parallel or otherwise to a load 109, to provide current to the load. Alternatively, any number of triboelectric generators in associated cavities may be electrically connected in parallel or otherwise to a power management circuit 201. The power management circuit 201 may be configured to modify input currents received from the triboelectric generators to provide a desired output current to the load 109. FIG. 11 shows two triboelectric generators in associated cavities electrically connected to a power management circuit 201, which is electrically connected to a load 109. However, any number of generators may be electrically coupled to the power management circuit 201. The load 109 and/or power management circuit 201 may be electrically coupled to the triboelectric generators using any suitable method. In one or more arrangements, discrete conductive wires may be used. In other arrangements, flexible printed circuits or circuit boards may be used. The elements electrically connecting the triboelectric generators, the power management circuit 201 and/or the load 109 may be molded into the elastomeric housing. Thus, the elastomeric triboelectric generator housing may be used to provide a triboelectric power system including the housing, at least one triboelectric generator incorporated into the housing, and a power management circuit electrically coupled to the at least one triboelectric generator. The power management circuit may be configured to receive an input current from the at least one triboelectric generator and to deliver an output current to a load electrically coupled to the power management circuit. In one or more arrangements, the load 109 may be an energy storage unit, for example, a rechargeable battery. The power management circuit may be electrically coupled to any desired number of triboelectric generators, to maximize generated power output.

It may be seen that the triboelectric generating system embodiments described herein enable electrical energy to be produced from the waste energy resulting from deformation and recovery cycles of the rubber outer wall of the vehicle tire when the tire is rotating on a road surface.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An elastomeric triboelectric generator housing structured for incorporation into a wheel for a vehicle, the housing comprising:
    a plurality of cavities; and
    a triboelectric generator incorporated into each cavity of the plurality of cavities, each cavity of the plurality of cavities being structured to actuate to operate the triboelectric generator responsive to application of at least one force to the housing along an axis extending through the cavity and between a central axis of the housing and a circumference of the housing, wherein the cavities of the plurality of cavities are positioned in two rows which are radially spaced-apart from each other.

2. The elastomeric triboelectric generator housing of claim 1, wherein each cavity of the plurality of cavities is structured to actuate responsive to application of a portion of a weight of a vehicle supported by a vehicle wheel, and a normal force exerted by a road surface to support a wheel, when the housing is incorporated into the wheel.

3. The elastomeric triboelectric generator housing of claim 1 wherein the housing is structured to be incorporated into a tire usable in the wheel of the vehicle.

4. The triboelectric generator housing of claim 1 wherein a first portion of the cavities of the plurality of cavities reside relatively closer to the central axis of the housing, a second portion of the cavities of the plurality of cavities reside relatively farther from the central axis of the housing than the cavities of the first portion of the cavities, and wherein the elastomeric triboelectric generator housing further comprises a plurality of force transmission members positioned within the housing, each force transmission member of the plurality of force transmission members having a first portion positioned proximate and spaced apart from the circumference of the housing, and a second portion positioned proximate and spaced apart from an associated cavity of the portion of the cavities residing relatively farther from the central axis of the housing, each force transmission member being structured to transmit a force acting on the circumference to the associated cavity residing relatively farther from the central axis of the housing so as to actuate the associated cavity.

5. A triboelectric power generating system comprising:
    an elastomeric triboelectric generator housing in accordance with claim 1; and
    a power management circuit electrically coupled to the triboelectric generators, the power management circuit being configured to receive input currents from the triboelectric generators and to deliver an output current to a load.

6. An elastomeric triboelectric generator housing structured for incorporation into a wheel for a vehicle, the housing comprising at least one cavity having a pair of opposed walls, and a triboelectric generator incorporated into the at least one first cavity, the at least one first cavity being structured to actuate responsive to application of at least one force to the housing along a first axis extending through the at least one first cavity and between a central axis of the housing and a circumference of the housing, wherein the housing is structured such that the at least one first cavity closes responsive to application of the at least one force to the housing along the axis, the housing further comprising at least one second cavity and a triboelectric generator incorporated into the at least one second cavity, the at least one second cavity being structured to actuate responsive to application of at least one force to the housing along a second axis extending through the at least one second cavity and between a central axis of the housing and a circumference of the housing, wherein the housing is structured such that the at least one second cavity opens responsive to application of forces applied to the housing along an axis extending through opposed ends of the at least one additional cavity, and wherein the second axis extends parallel to or along a radial line extending from the central axis of the housing and the circumference of the housing, and the first axis extends perpendicular to a radial line extending from the central axis of the housing and the circumference of the housing.

7. An elastomeric triboelectric generator housing structured for incorporation into a wheel for a vehicle, the housing comprising:
    at least one cavity having a pair of opposed walls;
    a triboelectric generator incorporated into the at least one cavity, the at least one cavity being structured to actuate responsive to application of at least one force to the housing along an axis extending through the at least one cavity and between a central axis of the housing and a circumference of the housing; and
    at least one force transmission member positioned within the housing, the at least one force transmission member having a first portion positioned proximate and spaced apart from the circumference of the housing, and a second portion positioned proximate and spaced apart from the at least one cavity, the at least one force transmission member being structured to transmit a force acting on the circumference to the at least one cavity so as to actuate the at least one cavity.

8. The elastomeric triboelectric generator housing of claim 7 wherein the at least one cavity has a rectangular shape.

9. The elastomeric triboelectric generator housing of claim 7 wherein at least one wall of the pair of opposed walls has an arcuate shape.

10. The elastomeric triboelectric generator housing of claim 7 comprising a plurality of cavities, each cavity of the plurality of cavities having a pair of opposed walls, each cavity of the plurality of cavities being structured to actuate responsive to application of at least one force to the housing along an associated axis extending through the cavity and between a central axis of the housing and a circumference of the housing.

11. The elastomeric triboelectric generator housing of claim 7 wherein the housing is structured such that the at least one cavity closes responsive to application of the at least one force to the housing along the axis.

12. The elastomeric triboelectric generator housing of claim 7 wherein the triboelectric generator comprises:
a first conductive electrode layer affixed to a first wall of the at least one cavity;
a second conductive electrode layer affixed to a second wall of the at least one cavity opposite the first wall; and
a first dielectric contact layer affixed to the first conductive electrode layer and positioned opposite the second conductive electrode layer so as to enable contact with the second conductive electrode layer during actuation of the at least one cavity,
the elastomeric triboelectric housing being structured such that the first dielectric contact layer and the second conductive electrode layer are spaced apart from each other when the at least one cavity is open, and so as to come into contact with each other when the at least one cavity is closed, thereby causing a charge imbalance when the at least one cavity opens after being closed.

13. A triboelectric power generating system comprising:
an elastomeric triboelectric generator housing in accordance with claim 7; and
a power management circuit electrically coupled to triboelectric generator, the power management circuit being configured to receive an input current from the triboelectric generator and to deliver an output current to a load.

14. A wheel for a vehicle, the wheel comprising a tire including an elastomeric triboelectric generator housing positioned within an interior of the tire, the housing including at least one cavity having a pair of opposed walls, the at least one cavity being structured to actuate responsive to application of at least one force to the housing along an axis extending through the at least one cavity and between a central axis of the housing and a circumference of the housing, wherein the circumference of the housing is in intimate contact with an interior surface of an outer wall of the tire structured to contact a road surface.

15. The wheel of claim 14 wherein the housing is formed from an elastomeric material having a stiffness less than a stiffness of a material from which the tire outer wall is formed.

16. The wheel of claim 14 wherein the housing includes a plurality of angularly spaced-apart cavities, each cavity of the plurality of cavities being positioned along an axis extending from a center of the wheel to an exterior tread surface of the tire.

17. The wheel of claim 14 wherein the at least one cavity is positioned along an axis extending from a center of the wheel to an exterior tread surface of the tire.

18. The wheel of claim 14 wherein the at least one cavity is structured to close responsive to contact between a road surface and a portion of the exterior tread surface residing along the axis extending through the at least one cavity.

19. The wheel of claim 18 further comprising at least one additional cavity positioned along another axis extending from a center of the wheel to an exterior tread surface of the tire, and wherein the at least one additional cavity is structured to open when a portion of an exterior tread surface of the tire residing along the other axis is in contact with a road surface.

20. The wheel of claim 18 wherein the at least one cavity is structured to open when a portion of the exterior tread surface of the tire residing along the axis extending through the at least one cavity is in not contact with a road surface.

* * * * *